United States Patent
Davidson et al.

(10) Patent No.: US 9,032,734 B2
(45) Date of Patent: *May 19, 2015

(54) MODULAR POWER INFRASTRUCTURE NETWORK, AND ASSOCIATED SYSTEMS AND METHODS

(71) Applicant: SuperCritical Technologies, Inc., Bremerton, WA (US)

(72) Inventors: Chal S. Davidson, Bremerton, WA (US); Joshua C. Walter, Kirkland, WA (US); Steven A. Wright, Albuquerque, NM (US)

(73) Assignee: SuperCritical Technologies, Inc., Bremerton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/843,033

(22) Filed: Mar. 15, 2013

(65) Prior Publication Data

US 2014/0083098 A1    Mar. 27, 2014

Related U.S. Application Data

(60) Provisional application No. 61/744,439, filed on Sep. 26, 2012.

(51) Int. Cl.
*F01K 7/32* (2006.01)
*F01K 25/02* (2006.01)
(Continued)

(52) U.S. Cl.
CPC .............. *F01K 7/32* (2013.01); *F24H 9/0005* (2013.01); *H02K 7/18* (2013.01); *G05F 1/66* (2013.01); *H02J 4/00* (2013.01)

(58) Field of Classification Search
CPC ......... F01K 7/32; F01K 13/00; F01K 25/103; F01K 13/02; F01K 25/10; F01K 11/02; F01K 11/04; F01K 15/02; F01K 17/02; F01K 23/065; F01K 23/10; F01K 25/08; F01K 3/00; F01K 3/185; F01K 7/00; F01K 7/08; F01K 7/16; F01K 7/22
USPC .................................................... 60/645–681
See application file for complete search history.

(56) References Cited

U.S. PATENT DOCUMENTS

| | | | |
|---|---|---|---|
| 4,498,289 | A | 2/1985 | Osgerby |
| 4,765,143 | A | 8/1988 | Crawford et al. |

(Continued)

FOREIGN PATENT DOCUMENTS

| | | | |
|---|---|---|---|
| WO | WO-2007131281 | A1 | 11/2007 |
| WO | WO-2012049259 | A1 | 4/2012 |

OTHER PUBLICATIONS

Angelino, "Carbon Dioxide Condensation Cycles for Power Production," Contributed by the Gas Turbine Division for presentation at the Gas Turbine Conference, Washington D. C., Mar. 17-21, 1968, of The American Society of Mechanical Engineers, Manuscript retrieved at ASME Headquarters, Dec. 28, 1967, Paper No. 68-CT-23, 9 pages.

(Continued)

*Primary Examiner* — Christopher Jetton
(74) *Attorney, Agent, or Firm* — Perkins Coie LLP

(57) ABSTRACT

Disclosed illustrative embodiments include modular power infrastructure networks, distributed electrical power infrastructure networks, methods for operating a modular power infrastructure network, and methods for fabricating a modular power infrastructure network.

34 Claims, 27 Drawing Sheets

(51) Int. Cl.
F02G 1/04 (2006.01)
F24H 9/00 (2006.01)
H02K 7/18 (2006.01)
G05F 1/66 (2006.01)
H02J 4/00 (2006.01)

(56) References Cited

U.S. PATENT DOCUMENTS

| | | | |
|---|---|---|---|
| 6,470,683 | B1 | 10/2002 | Childs et al. |
| 6,581,384 | B1 | 6/2003 | Benson |
| 7,313,926 | B2 | 1/2008 | Gurin |
| 7,685,820 | B2* | 3/2010 | Litwin et al. ............... 60/641.11 |
| 7,900,450 | B2 | 3/2011 | Gurin |
| 8,015,812 | B1 | 9/2011 | Kesseli et al. |
| 8,096,128 | B2* | 1/2012 | Held et al. ..................... 60/645 |
| 8,099,198 | B2 | 1/2012 | Gurin |
| 8,132,412 | B2 | 3/2012 | Bennett |
| 8,166,761 | B2 | 5/2012 | Moghtaderi et al. |
| 8,397,506 | B1 | 3/2013 | Wright et al. |
| 8,613,195 | B2* | 12/2013 | Held et al. ..................... 60/660 |
| 2004/0244376 | A1 | 12/2004 | Litwin et al. |
| 2010/0024421 | A1 | 2/2010 | Litwin et al. |
| 2010/0287934 | A1 | 11/2010 | Glynn et al. |
| 2011/0061384 | A1* | 3/2011 | Held et al. ..................... 60/645 |
| 2012/0017597 | A1 | 1/2012 | Freund et al. |
| 2012/0047892 | A1 | 3/2012 | Held et al. |
| 2012/0067055 | A1 | 3/2012 | Held |
| 2012/0102996 | A1 | 5/2012 | Freund |
| 2012/0128463 | A1 | 5/2012 | Held |
| 2012/0131921 | A1 | 5/2012 | Held |
| 2013/0033044 | A1 | 2/2013 | Wright et al. |

OTHER PUBLICATIONS

Angelino, "Perspectives for the Liquid Phase Compression Gas Turbine," Contributed by the Gas Turbine Conference and Products Show, Zurich, Switzerland, Mar. 13-17, 1966, of The American Society of Mechanical Engineers, Manuscript received at ASME Headquarters, Dec. 15, 1965, Paper No. 66-CT-111, 10 pages.
Angelino, "Real Gas Effects in Carbon Dioxide Cycles," Contributed by the Gas Turbine Division of The American Society of Mechanical Engineers for presentation at the International Gas Turbine Conference & Products Show, Cleveland, Ohio, Mar. 10-13, 1969, 12 pages.
Conboy, et al., "Performance Characteristics of an Operating Supercritical CO2 Brayton Cycle," Draft, Proceedings of the ASME Turbo Expo 2012, Jun. 11-15, 2012, Copenhagen, Denmark, 12 pages.
Dostal, et al., "A Supercritical Carbon Dioxide Cycle for Next Generation Nuclear Reactors," Advanced Nuclear Power Technology Program, MIT-ANP-TR-100, Mar. 10, 2004,160 pages, 1 of 2.
Dostal, et al., "A Supercritical Carbon Dioxide Cycle for Next Generation Nuclear Reactors," Advanced Nuclear Power Technology Program, MIT-ANP-TR-100, Mar. 10, 2004,165 pages, 2 of 2.
International Search Report and Written Opinion for PCT/US2013/060297 Mailed Jan. 2, 2014, 10 pages.
Muto, et al., "Optimal Cycle Scheme of Direct Cycle Supercritical CO2 Gas Turbine for Nuclear Power Generation Systems," International Conference on Power Engineering 2007, Oct. 23-27, 2007, Hangzhou, China, 7 pages.
Conboy et al., "Experimental Investigation of the S-CO2 Condensing Cycle," In Proceedings of the Supercritical CO2 Power Cycle Symposium, Boulder, Colorado, May 24-25, 2011, 14 pages.
Lewis et al., "Supercritical CO2 Mixture Behavior for Advanced Power Cycles and Applications," In Proceedings of Supercritical CO2 Power Cycle Symposium, Boulder, Colorado, May 24-25, 2011, 2 pages.
Sienicki et al., "Scale Dependencies of Supercritical Carbon Dioxide Brayton Cycle Technologies and the Optimal Size for a Next-Step Supercritical CO2 Cycle Demonstration," in Proceedings of the Supercritical CO2 Power Cycle Symposium, Boulder, Colorado, 2011, 5 pages.

Suo-Anttila et al., "Computational Fluid dynamics Code for Supercritical fluids," in Proceedings of the Supercritical CO2 Power Cycle Symposium, Boulder, Colorado, 2011, 8 pages.
Vilim et al., "Dynamic System Analysis of a SuperCritical CO2 Compression Loop," In Proceedings of International Congress on Advances in Nuclear Power Plants, Anaheim, CA, USA, Jun. 8-12, 2008, 7 pages.
Wright et al., "Break-even Power Transients for two Simple Recuperated S- CO2 Brayton Cycle Test Configurations," in Proceedings of Supercritical CO2 Power Cycle Symposium, Boulder, Colorado, May 24-25, 2011, 31 pages.
Wright et al., "Closed Brayton Cycle Power Conversion Systems for Nuclear Reactors," Modeling, Operations, and Validation, SAND2006-2518, Sandia National Laboratories, Albuquerque, NM, 2006, first section of pp. 1-150.
Wright et al., "Closed Brayton Cycle Power Conversion Systems for Nuclear Reactors," Modeling, Operations, and Validation, SAND2006-2518, Sandia National Laboratories, Albuquerque, NM, 2006, second section of pp. 151-257.
Wright et al., "Description and Test Results from a Supercritical CO2 Brayton Cycle Development Program," Aug. 2009, Sandia National Laboratories, Albuquerque, New Mexico, American Institute of Aeronautics and Astronautics, 13 pages.
Wright et al., "Dynamic Modeling and Control of Nuclear Reactors Coupled to Closed-Loop Brayton Cycle Systems using Simulink," in Proceedings of Space Technology and Applications International Forum (STAIF-2005), Feb. 2005, 14 pages.
Wright et al., "Impact of Closed Brayton Cycle Test Results on Gas Cooled Reactor Operation and Safety", in Proceedings of International Congress on Advances in Nuclear Power Plants, Nice, France May 13-18, 2007, 9 pages.
Wright et al., "Initial status and test results from a SuperCritical CO2 Brayton Cycle Test Loop," in Proceedings of International Congress on Advances in Nuclear Power Plants, Anaheim, CA, USA, Jun. 8-12, 2008, 8 pages.
Wright et al., "Modeling and experimental results for condensing supercritical CO2 power cycles," Sandia Report SAND2010-8840, 2011, 47 pages.
Wright et al., "Operation and Analysis of a Supercritical CO2 Brayton Cycle," SAND2010-0171, Sep. 2010, 101 pages.
Wright et al., "Operational Curves for HTGR's Coupled to Closed Brayton Cycle Power Conversion Systems", in Proceedings of International Congress on Advances in Nuclear Power Plants, Jun. 4-8, Reno, 2006, 8 pages.
Wright et al., "Operational Results of a Closed Brayton Cycle Test-Loop," Proceedings of Space Technology and Applications, International Forum (STAIF-2005), Albuquerque, New Mexico Feb. 2005, 12 pages.
Wright et al., "Self-Driven Decay Heat Removal in a GCR Closed Brayton Cycle Power System," in Proceedings of International Congress on Advances in Nuclear Power Plants, Jun. 4-8, 2006, 9 pages.
Wright et al., "Summary of the Sandia Supercritical CO2 Development Program," in Proceedings of Supercritical CO2 Power Cycle Symposium, Boulder, Colorado, May 24-25, 2011, 16 pages.
Wright et al., "SuperCritical CO2 Brayton Cycle Compression and Control Near the Critical Point," In Proceedings of International Congress on Advances in Nuclear Power Plants, Anaheim, CA, USA, Jun. 8-12, 2008, 10 pages.
Wright et al., "Supercritical CO2 Direct Cycle Gas Fast Reactor (SC-GFR) Concept, In Proceedings of the Supercritical CO2 Power Cycle Symposium," Boulder, Colorado, May 24-25, 2011, 9 pages.
Wright et al., "Turbomachinery Scaling Considerations for Supercritical CO2 Brayton Cycles," DOE-letter GenIV level 3 report Dec. 31, 2009, 13 pages.
Wright, "Non-Nuclear Validation Test Results of a Closed Brayton Cycle Tes-Loop," AIP Conf. Proc. 880, pp. 157-166, Space Technology and Application International Forum-STAIF 2007, 10 pages.
Wright, "Preliminary Results of Dynamic System Model for a Closed-Loop Brayton Cycle Coupled to a Nuclear Reactor," in Proceedings 1st International Energy Conversion Engineering Conference, 17-21 Portsmouth, VA, Aug. 17-21, 2003, 12 pages.

* cited by examiner

MODULAR POWER INFRASTRUCTURE NETWORK, AND ASSOCIATED SYSTEMS AND METHODS

CROSS-REFERENCE TO RELATED APPLICATION

The present application claims priority to U.S. Provisional Application 61/744,439, filed Sep. 26, 2012, entitled "MODULAR POWER INFRASTRUCTURE," and incorporated herein by reference. To the extent the foregoing application and/or any other references incorporated herein by reference conflict with the present disclosure, the present disclosure controls.

BACKGROUND

The present application is related to working fluids and their use in thermodynamic cycles.

SUMMARY

Disclosed illustrative embodiments include modular power infrastructure networks, distributed electrical power infrastructure networks, methods for operating a modular power infrastructure network, and methods for fabricating a modular power infrastructure network.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
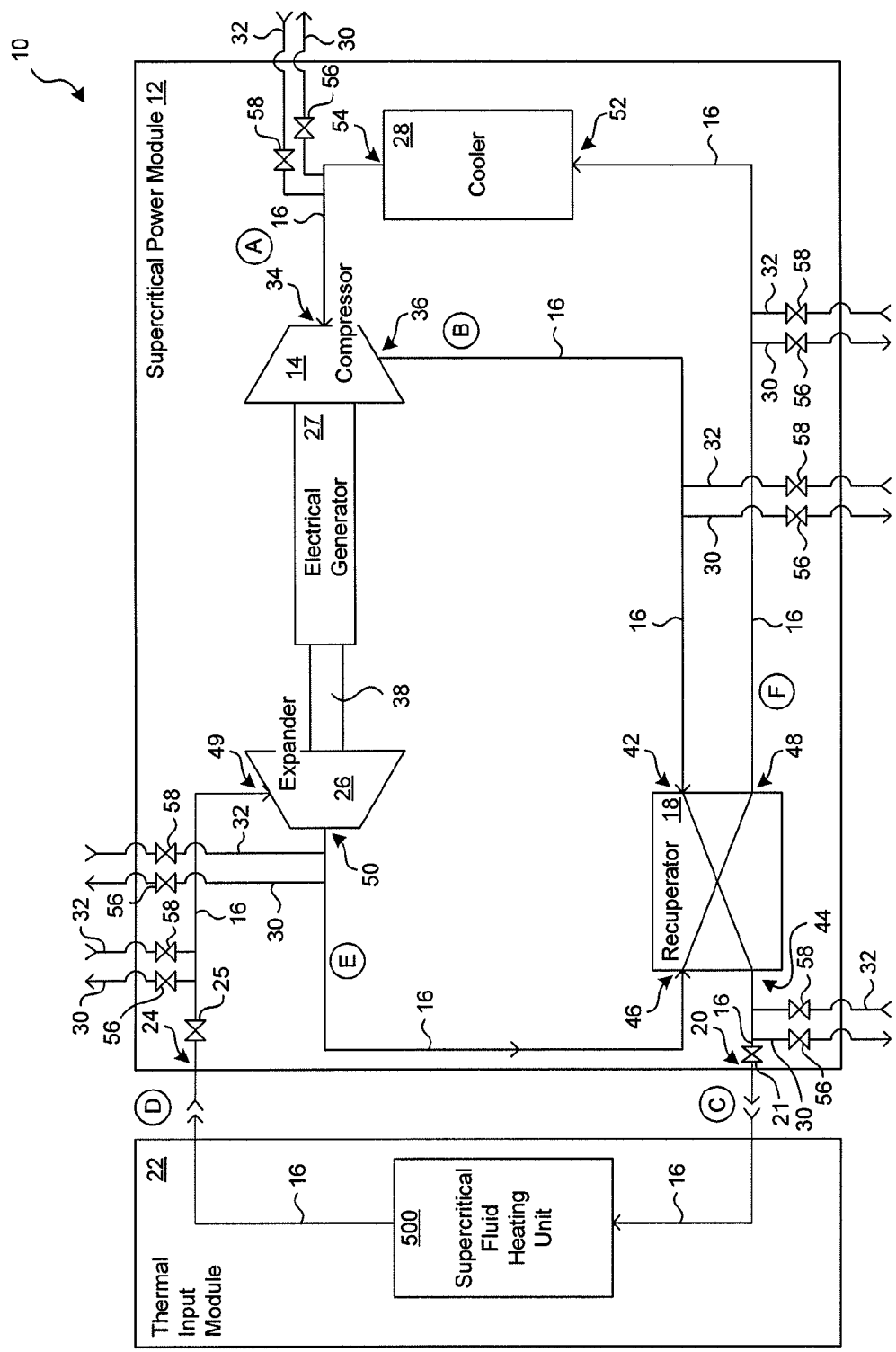
FIG. 1 is a schematic illustration of an illustrative embodiment of a modular power infrastructure network.

In the following detailed description, reference is made to the accompanying drawings, which form a part hereof. In the drawings, similar symbols typically identify similar components, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are included. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Many embodiments of the technology described below may take the form of computer-executable instructions, including routines executed by a programmable computer. Those skilled in the relevant art will appreciate that the technology can be practiced on computer systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. In particular embodiments, data structures and transmissions of data particular to aspects of the technology are also encompassed within the scope of the technology.

Overview

Given by way of overview, disclosed illustrative embodiments include modular power infrastructure networks, distributed electrical power infrastructure networks, methods for operating a modular power infrastructure network, and methods for fabricating a modular power infrastructure network.

Referring briefly to FIG. 1, in an illustrative embodiment given by way of non-limiting example, an illustrative modular power infrastructure network 10 includes a supercritical power module 12. The supercritical power module 12 includes a compressor 14 structured to compress a supercritical fluid 16. A recuperator 18 is structured to heat the compressed supercritical fluid 16. An outlet path 20 is structured to provide heated compressed supercritical fluid 16 from the recuperator 18 to a heat source, such as a thermal input module 22. An inlet path 24 is structured to provide heated compressed supercritical fluid 16 from the heat source, such as the thermal input module 22. An expander 26 is coupled to receive heated compressed supercritical fluid 16 from the heat source 22 and is structured to convert a drop in enthalpy of the supercritical fluid 16 to mechanical energy. A cooler 28 is structured to cool expanded supercritical fluid 16 from the recuperator 18 and provide cooled supercritical fluid 16 to the compressor 14. A supercritical fluid supply path 30 is structured to supply supercritical fluid 16 from the supercritical power module 12. A supercritical fluid return path 32 is structured to return supercritical fluid 16 to the supercritical power module 12.

Continuing by way of overview, various embodiments of modular power infrastructure networks are provided. In some embodiments (such as that shown in FIG. 1), the modular power infrastructure network 10 may include the supercritical power module 12 that operates according to a simple recuperated Brayton cycle. In some other embodiments, a modular power infrastructure network (not shown in FIG. 1) may include a supercritical power module (not shown in FIG. 1) that operates according to a recompression Brayton cycle. Regardless of thermodynamic cycle, in various embodiments the supercritical power module suitably is disposed within a modular, containerized platform (not shown in FIG. 1). Also regardless of thermodynamic cycle, if desired various embodiments of the modular power infrastructure network may also include, in addition to the supercritical power module, one or more other modules (not shown in FIG. 1) that may be connectable with various modules within the modular power infrastructure network to help address various issues, such as without limitation various fueling options, different operating environments, heating and cooling needs, mechanical work requirements, siting constraints, and/or efficiency needs, as desired for a particular application. Illustrative embodiments of modular power infrastructure networks, including the supercritical power module and the other modules that make up various embodiments of the modular power infrastructure network, will be discussed below by way of non-limiting examples.

As discussed above, the present application is related to working fluids and their use in thermodynamic cycles. In various embodiments, such thermodynamic cycles may include a Brayton cycle, a Rankine cycle, or the like. Moreover, in various embodiments in which the thermodynamic cycle is a Brayton cycle, the Brayton cycle may be implemented as a simple recuperated Brayton cycle or a recompression Brayton cycle, as desired for a particular application. The Brayton thermodynamic cycles and the Rankine thermodynamic cycles are generally characterized by pressurization of a working fluid such as by compression and/or pumping, heat addition to the working fluid, expansion of the heated and pressurized fluid in a device for converting kinetic, thermal, or potential energy of the working fluid to mechanical energy, and then rejection of energy from the working fluid. In a closed system, after expansion the working fluid is re-pressurized, and the working fluid undergoes the above process in a cyclical manner.

As is known, working fluids may be capable of transitioning to a supercritical state at one or more points of the thermodynamic cycle process. In addition, the working fluid may be entirely within a supercritical state at every point of the thermodynamic cycle. As is also known, a supercritical state is defined as a state of temperature and pressure above the critical point of the fluid. When in the supercritical state, the fluids are capable of transitioning to higher pressure with small amounts of change in entropy, relative to pressurization of the fluid in its ideal state. The compressibility of supercritical fluids allows for a reduced number of compression stages relative to similar compression of a fluid in the gaseous state. Supercritical fluids also exhibit reduced viscosity and surface tension relative to their fluid states. The combination of these features allows supercritical working fluids to exhibit high rates of mass flow in rotating machinery, thereby reducing required areal size of the rotating machinery to achieve a given amount of work output.

Any one or more of several supercritical fluids, such as Xe, Kr, $CO_2$, and/or He, may be used in various embodiments. These supercritical fluids may be in the form of mixtures as well as in a pure form. These supercritical fluids may also be mixed with any number of organic gases or gaseous impurities. For sake of brevity, this discussion will generally relate to use of $CO_2$ in the supercritical state (sometimes referred to as "$sCO_2$"); however, it will be understood that similar principles apply to the other above-mentioned supercritical fluids or mixtures thereof. To that end, any one or more of the above-mentioned supercritical fluids may be used as desired for a particular application. For example, considerations for use of any particular supercritical fluid may include choice of operating temperature or pressure of a desired thermomechanical energy conversion system. Accordingly, limitation to any particular supercritical fluid is not intended and is not to be inferred.

Simple Recuperated Brayton Cycle

Referring back to FIG. 1, in an embodiment the illustrative modular power infrastructure network 10 includes the supercritical power module 12. When connected to a source of thermal energy, the supercritical power module 12 can convert a drop in enthalpy of the supercritical fluid 16 to mechanical energy and can supply supercritical fluid to any other modules that may be coupled to receive supercritical fluid from the supercritical power module 12. As discussed above, the supercritical power module 12 operates according to a Brayton thermodynamic cycle. In the embodiment shown in FIG. 1, the supercritical power module 12 implements a simple recuperated Brayton cycle (as will be explained below with reference to FIG. 2).

In the embodiment shown in FIG. 1 and as will be explained below with details given by way of illustration and not limitation, the supercritical power module 12 suitably includes the compressor 14, the recuperator 18, the outlet path 20, the inlet path 24, the expander 26, the cooler 28, the supercritical fluid supply path 30, and the supercritical fluid return path 32. As will also be explained below, in some embodiments the supercritical power module 12 may include at least one electrical power generator 27.

The compressor 14 is structured to compress, that is raise the pressure of, the supercritical fluid 16. The compressor 14 has an inlet 34 and an outlet 36. In various embodiments, the compressor 14 suitably may be implemented as any suitable device, such as a compressor or a pump or the like, that raises the pressure of the supercritical fluid 16. In some embodiments, the compressor 14 is operatively coupled to the expander 26 with a shaft 38. In such embodiments, the expander 26 converts a drop in enthalpy of the supercritical fluid 16 to mechanical energy that includes rotation of the shaft 38, thereby rotating the compressor 14. It will be appreciated that operatively coupling of the compressor 14 to the expander 26 may be made via a mechanical coupling (such as a gearbox or the like) or, if desired, a magnetic coupling.

The recuperator 18 is structured to heat the compressed supercritical fluid 16. The recuperator 18 suitably is any type of heat exchanger, such as a tube-and-shell heat exchanger, a printed circuit heat exchanger, or the like. The heat exchanger of the recuperator 18 may be implemented using any suitable flow orientation as desired, such as a cross-flow orientation, a counter-flow orientation, or a parallel-flow orientation. The recuperator 18 suitably is sized to have a selected heat transfer capacity as desired for a particular application. In the embodiment shown in FIG. 1, the recuperator 18 is in fluid communication with the compressor outlet 36. The recuperator includes an inlet 42, coupled in fluid communication with the compressor outlet 36, and an outlet 44 that define one side of the heat exchanger of the recuperator 18. The recuperator also includes an inlet 46, coupled in fluid communication with the expander 26 to receive expanded supercritical fluid 16, and an outlet 48 that define another side of the heat exchanger of the recuperator 18. Heat is transferred to compressed supercritical fluid 16 flowing between the inlet 42 and the outlet 44 on one side of the heat exchanger from expanded supercritical fluid 16 flowing between the inlet 46 and the outlet 48 on the other side of the heat exchanger.

The outlet path 20 is structured to provide heated compressed supercritical fluid 16 from the recuperator 18 to a heat source, such as a thermal input module 22. The outlet path 20 includes a suitable isolation valve 21. The heat source, such as the thermal input module 22, suitably heats supercritical fluid provided thereto from the outlet path 20. The inlet path 24 is structured to provide heated compressed supercritical fluid 16 from the heat source 22. The inlet path 24 includes a suitable isolation valve 25. It will be appreciated that the thermal input module 22 is considered to be a module that is outside the module boundary of the supercritical power module 12. As such, embodiments of the thermal input module 22 will be described below along with other modules that may be included as desired in embodiments of modular power infrastructure networks.

The expander 26 is coupled to receive heated compressed supercritical fluid 16 from the heat source, such as the thermal input module 22, and is structured to convert a drop in enthalpy of the supercritical fluid 16 to mechanical energy, such as without limitation rotation of the shaft 38. The expander 26 suitably may include any suitable device capable of expanding the heat supercritical fluid 16 received from the inlet path 24 and converting a drop in enthalpy of the supercritical fluid 16 to mechanical energy. As such, in some embodiments the expander 26 suitably may include without limitation a turbine or turbomachinery, such as without limitation a turbo-expander, an expansion turbine, a centrifugal turbine, an axial flow turbine, and/or the like. In such embodiments, the expander 26 causes the shaft 38 to rotate at very high rotational velocities, such as without limitation rotational velocities much greater than 3600 revolutions per minute. In some other embodiments, the expander 26 suitably may also include a reciprocating engine. It will be appreciated that, in some embodiments, more than one expander 26 may be provided, as desired for a particular application.

As shown in the embodiment of FIG. 1, the expander 26 has an inlet 49 operatively coupled in fluid communication with the inlet path 24 and an outlet 50 operatively coupled in fluid communication with the inlet 46 of the recuperator 18 to transfer heat from expanded supercritical fluid 16 to compressed supercritical fluid 16.

In some embodiments an electrical power generator 27 may be operationally coupled to the expander 26 with the shaft 38. The electrical power generator 27 may be any suitable electrical power generator known in the art, such as a turbogenerator, an alternator, or any other suitable electrical power generator known in the art. The electrical power generator 27 may be sized to have an electrical power generating capacity as desired for a particular application. Also, it will be appreciated that, in some embodiments, more than one electrical power generator 27 may be provided, as desired for a particular application. Given by way of non-limiting example, depending on the particular application, in some embodiments the electrical power generator 27 (or all of the electrical power generators 27) may have a rating in a range between 2-6 $KW_e$. In some embodiments and given by way of non-limiting example, the electrical power generator 27 (or all of the electrical power generators 27) may have a rating on the order of around 5 $KW_e$ or so, as desired for a particular application. It will be appreciated that no limitation regarding rating of the electrical power generator 27 (or cumulative rating of all of the electrical power generators 27) is intended and is not to be inferred.

The cooler 28 is structured to cool expanded supercritical fluid 16 from the recuperator 18 and provide cooled supercritical fluid 16 to the compressor 14. The cooler 28 has an inlet 52 that is operatively coupled in fluid communication to the outlet 48 of the recuperator 18 and an outlet 54 that is operatively coupled in fluid communication to the inlet 34 of the compressor 14. The cooler 28 may be any cooler that is suitable for cooling the supercritical fluid 16. For example and given by way of illustration and not of limitation, in various embodiments the cooler 28 may include: a "wet" cooler, such as a condenser; a heat exchanger like a tube-and-shell heat exchanger or a printed circuit heat exchanger; or a "dry" cooler, such as a forced-air cooling "radiator" or the like.

At least one supercritical fluid supply path 30 is structured to supply supercritical fluid 16 from the supercritical power module 12. The supercritical fluid 16 that is supplied from the supercritical power module 12 may be expanded supercritical fluid 16 and/or compressed supercritical fluid 16, as desired for a particular application. The supercritical fluid 16 may be supplied from the supercritical power module 12 via the supercritical fluid supply path 30 to any other suitable module or modules (not shown in FIG. 1) in the modular power infrastructure network as desired for a particular application.

It may be desirable to provide supercritical fluid 16 at various temperatures and entropy levels from the supercritical power module 12 to one or more modules (not shown in FIG. 1) in the modular power infrastructure network as desired for a particular application. Accordingly, in various embodiments, the supercritical fluid supply paths 30 suitably may be provided at locations between one or more of the following components: the outlet 36 of the compressor 14 and the inlet 42 of the recuperator 18; the outlet 44 of the recuperator 18 and the isolation valve 21 in the outlet path 20; the isolation valve 25 in the inlet path 24 and the inlet 49 of the expander 48; the outlet 50 of the expander 26 and the inlet 46 of the recuperator 18; the outlet 48 of the recuperator 18 and the inlet 52 of the cooler 28; and the outlet 54 of the cooler 28 and the inlet 34 of the compressor 14. Each supercritical fluid supply path 30 is isolated via a suitable isolation valve 56.

In particular embodiments, the modular features described above and described in further detail below can provide one or more of several advantages. Such advantages include the ability to easily increase (or decrease) the capacity of a network by adding (or removing) modules, even though the modules may have different energy-producing capabilities and/or other characteristics. Each module can be compatible with a wide variety of external modules (e.g., heat modules or thermal input modules). In particular embodiments one or more modules can reject energy as heat e.g., when the electrical power produced by the module is not required. Any one or combination of the foregoing features can improve the ability for an operator to control module functions remotely. As a result, the modules can be more readily installed in remote and/or unmanned locations.

At least one supercritical fluid return path 32 is structured to return supercritical fluid 16 to the supercritical power module 12 from the other module or modules (not shown in FIG. 1) to which the supercritical fluid 16 has been supplied via the supercritical fluid supply path 30. Accordingly, in various embodiments, the supercritical fluid return paths 32 suitably may be provided at locations between one or more of the following components: the outlet 36 of the compressor 14 and the inlet 42 of the recuperator 18; the outlet 44 of the recuperator 18 and the isolation valve 21 in the outlet path 20; the isolation valve 25 in the inlet path 24 and the inlet 49 of the expander 48; the outlet 50 of the expander 26 and the inlet 46 of the recuperator 18; the outlet 48 of the recuperator 18 and the inlet 52 of the cooler 28; and the outlet 54 of the cooler 28 and the inlet 34 of the compressor 14. Each supercritical fluid return path 32 is isolated via a suitable isolation valve 58.

The components of the supercritical power module 12 discussed above suitably may be interconnected with piping, tubing, fittings, connectors, and the like appropriate for temperature and pressure conditions and for compatibility with the supercritical fluid 16 contained therein and flowing therethrough. In addition in some embodiments, if desired, connections between components of the supercritical power module 12 may be made with "quick disconnect"-type fittings, thereby helping contribute to modularity of the supercritical power module 12. Moreover, in some embodiments, physical arrangement of components of the supercritical power module 12 may be standardized. That is, a set amount of space may be allocated for a particular component and a standard mounting pad or the like may be utilized for that particular component regardless of size or rating of the particular component, thereby also helping contribute to modularity of the supercritical power module 12.

In some embodiments, if desired connections between the supercritical power module 12 and other modules, such as those at terminations of the outlet path 20, the inlet path 24, the supercritical fluid supply path 30, and the supercritical fluid return path 32 may be made with "quick disconnect"-type fittings, thereby helping contribute to modularity of the modular power infrastructure network 10.

In some embodiments, the supercritical power module 12 may be implemented in one or more standard containers, such as an ocean-going cargo container or the like, thereby helping contribute to modularity of the modular power infrastructure network 10. Moreover, a standard container may be considered to include any such container shipped via road, truck, train, airlift, or water-going vessel.

Now that the illustrative modular power infrastructure network 10 and its components have been discussed, operation of embodiments of the modular power infrastructure network 10 will be discussed below with reference to FIG. 2.

Figure 2:
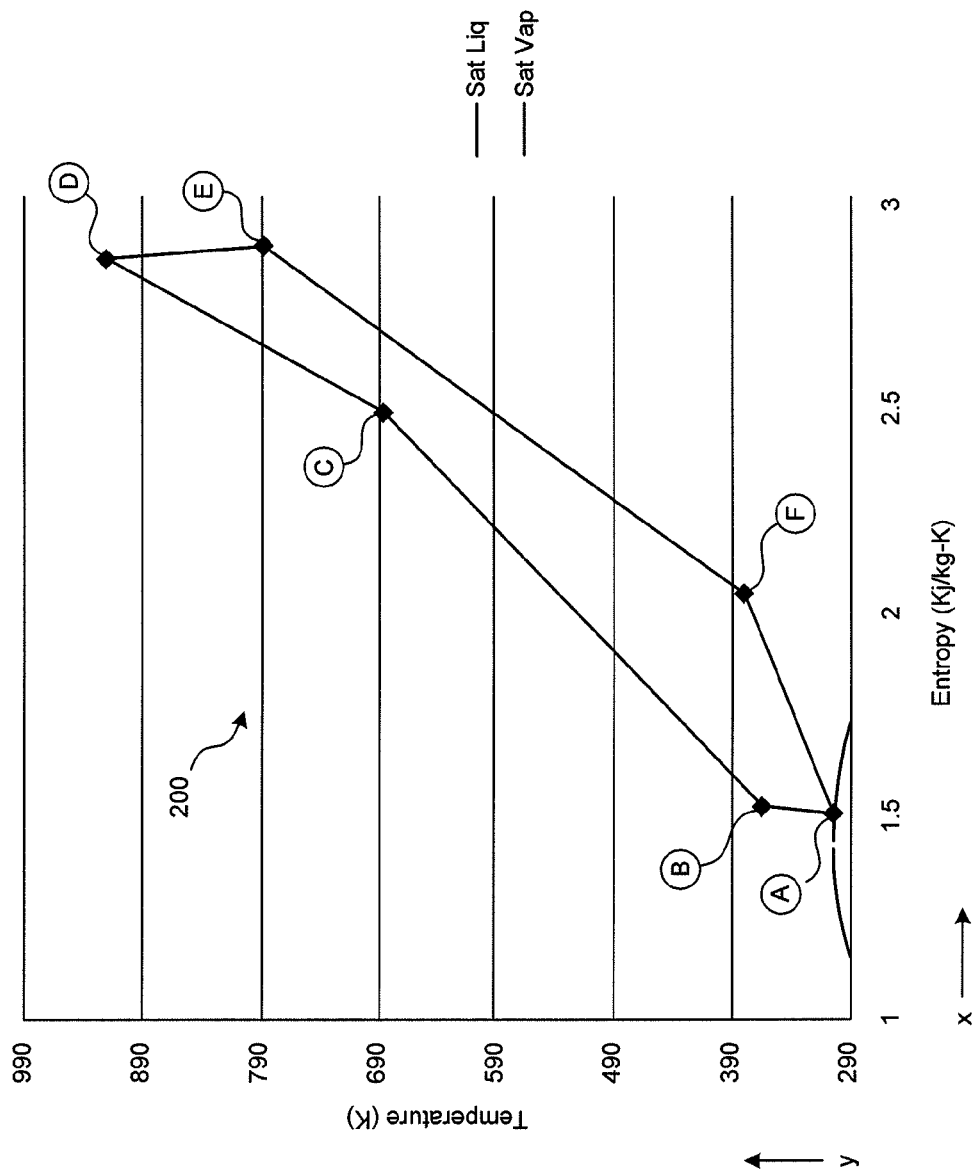
FIG. 2 is a graph of entropy versus temperature for a thermodynamic cycle implemented by the modular power infrastructure network of FIG. 1.

Referring additionally to FIG. 2, entropy (in Kj/kg-K) is graphed versus temperature (in degrees K) for a simple recuperated cycle, such as that implemented by the modular power infrastructure network 10. In the discussion below, phases of the thermodynamic cycle illustrated in FIG. 2 are mapped to corresponding components of the modular power infrastructure network 10 that may implement phases associated therewith. Alphabetic references (indicated in FIG. 1 and FIG. 2) are made to relate phases of the cycle illustrated in FIG. 2 to associated components illustrated in FIG. 1.

FIG. 2 graphs a curve 200 of entropy (in Kj/kg-K) along an x-axis versus temperature (in degrees K) along a y-axis. It will be appreciated that values for entropy and temperature are given by way of illustration only and not of limitation. It will be further appreciated that values of entropy and temperature may be affected by amounts of supercritical fluid 16 that may or may not be provided to other modules (not shown in FIGS. 1 and 2) in the modular power infrastructure network as desired for a particular purpose.

Referring now to FIGS. 1 and 2, between points A and B temperature of the supercritical fluid 16 is raised in a nearly substantially isentropic process as pressure of the supercritical fluid 16 is raised in the compressor 14 (approximating the well-known relationship $PV=nRT$). Between points B and C temperature and enthalpy of the supercritical fluid 16 are raised between the inlet 42 of the recuperator 18 and the outlet 44 of the recuperator 18. Between points C and D temperature of the supercritical fluid 16 is raised by the heat source, such as the thermal input module 22, between the outlet path 20 and the inlet path 24. Between points D and E temperature of the supercritical fluid 16 is lowered in a nearly substantially isentropic process as the supercritical fluid 16 is expanded, and the pressure thereof is reduced accordingly, in the expander 26. Between points E and F temperature and enthalpy of the supercritical fluid 16 are reduced between the inlet 46 of recuperator 18 and the outlet 48 of the recuperator 18. Between points F and A temperature and enthalpy of the supercritical fluid 16 are further reduced by the cooler 28. As used herein, "supercritical" fluid refers to a fluid that is in a supercritical state during one or more operational portions of a cycle.

It will be appreciated that, as seen in FIG. 2, in some embodiments the supercritical fluid 16 may remain in the supercritical state during all phases of the thermodynamic cycle shown in FIG. 2. However, it will be appreciated that, at one or more points during the process shown along the curve 200 a state other than a supercritical state may exist. Nonetheless, for sake of simplicity, reference is only made to the supercritical fluid 16 as opposed to a fluid having one or more properties other than that of a supercritical fluid.

A control system (not shown in FIG. 1) suitably is provided in operative communication with components of the modular power infrastructure network 10 to monitor various parameters and provide feedback to control operation of the modular power infrastructure network 10. The control system may suitably monitor at least temperature, pressure, and flow rate at selected locations within the modular power infrastructure network 10 that correspond to the points A, B, C, D, E, and F (FIGS. 1 and 2). In some embodiments the control system also may suitably monitor speed of the shaft 38 and/or electrical load of the electrical generator 27. In some embodiments the control system may monitor heat flux in the thermal input module 22. The control system suitably compares monitored conditions to desired parameters, generates appropriate control signals, and controls the components of the modular power infrastructure network 10 to vary speed of the shaft 38, ratio compression ratio of the compressor 14, amount of heat added by the thermal input module 22, and/or the like. The control system suitably may be implemented with any suitable controller, such as without limitation any suitable logic controller or the like, any suitable sensors (such as thermocouples, pressure sensors, flow rate sensors, rotational speed sensors, voltage sensors, current sensors, electrical power sensors, and/or heat flux sensors) and any suitable control actuators (such as without limitation throttle valves, rheostats, and the like).

Before discussing further modules that may be included in other embodiments of modular power infrastructure networks, as desired, another thermodynamic cycle that may be implemented by embodiments of the supercritical power module will be discussed. As will be appreciated, the other modules may be included in any embodiment of a modular power infrastructure network, as desired, regardless of thermodynamic cycle implemented within the supercritical power module.

Recompression Brayton Cycle

Figure 3:
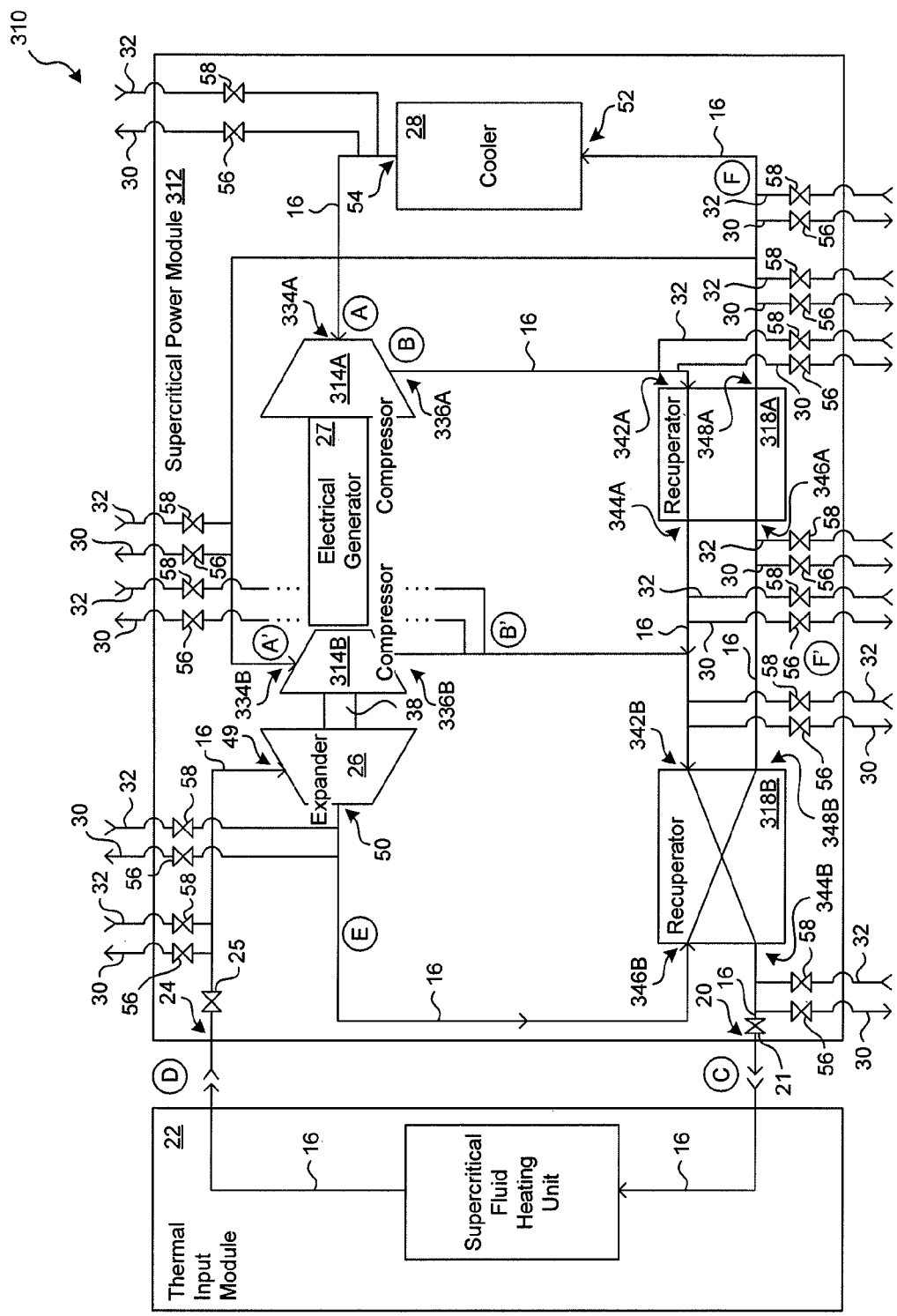
FIG. 3 is a schematic illustration of another illustrative embodiment of a modular power infrastructure network.
Figure 4:
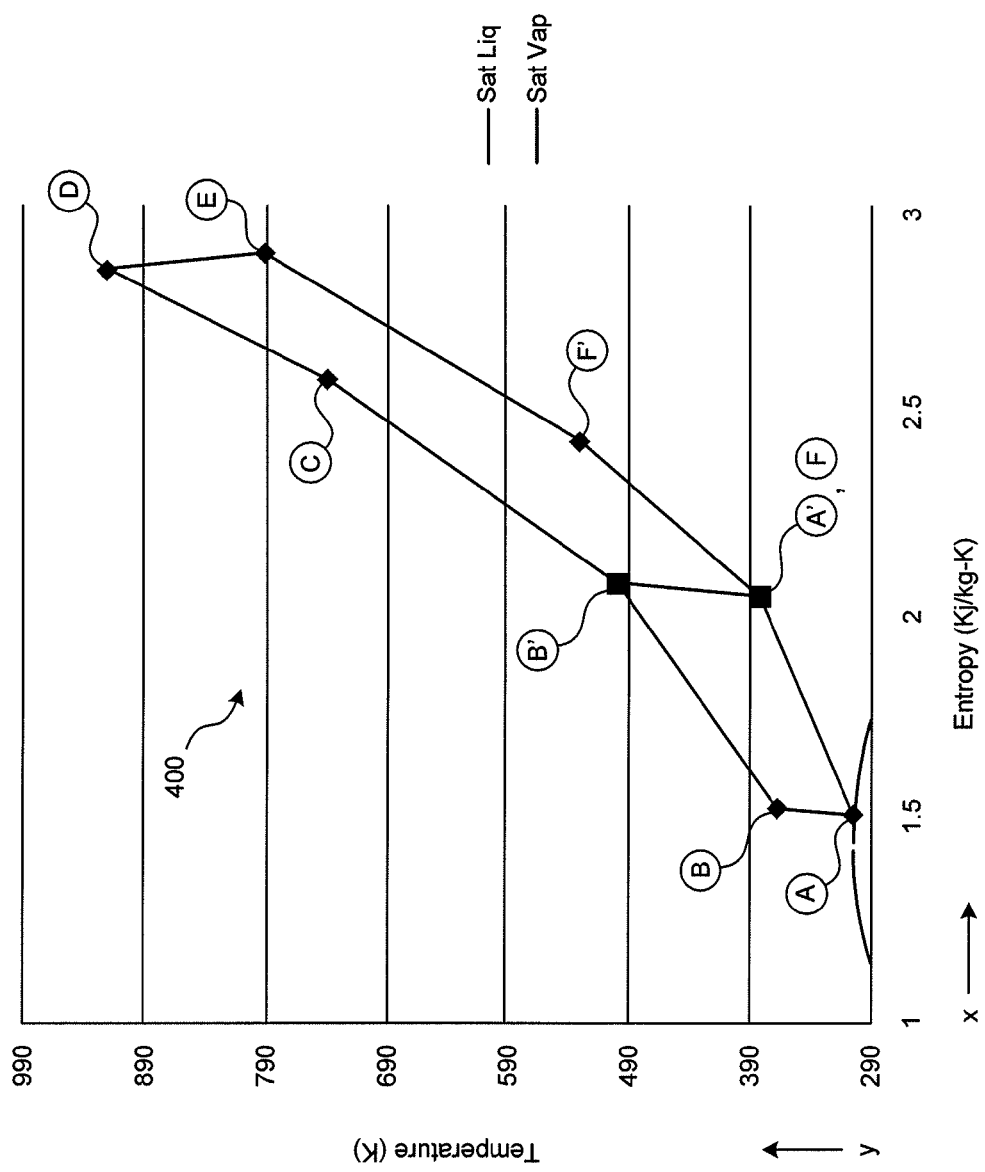
FIG. 4 is a graph of entropy versus temperature for a thermodynamic cycle implemented by the modular power infrastructure network of FIG. 3.

Referring now to FIGS. 3 and 4, in another embodiment a modular power infrastructure network 310 includes a supercritical power module 312 that suitably implements a recompression Brayton cycle. It will be appreciated that the supercritical power module 312 and the supercritical power module 12 (FIG. 1) share many common components that have been discussed above. For sake of brevity, details regarding components that are common to the supercritical power module 312 and the supercritical power module 12 (FIG. 1) will not be repeated. The same reference numbers will be used to refer to components that are common to the supercritical power module 312 and the supercritical power module 12 (FIG. 1).

In an illustrative embodiment, the modular power infrastructure network 310 includes the supercritical power module 312 that suitably implements a recompression Brayton cycle. Given by way of overview, in the supercritical power module 312 a compressor 314A is structured to compress the supercritical fluid 16. A recuperator 318A is structured to heat compressed supercritical fluid 16 from the compressor 314A. A compressor 314B is structured to compress the supercritical fluid 16 in parallel with the compressor 314A. A recuperator 318B is structured to heat compressed supercritical fluid 16 from the compressor 314A and the compressor 314B. The outlet path 20 is structured to provide heated compressed supercritical fluid 16 from the recuperator 318B to a heat source, such as a thermal input module 22. The inlet path 24 is structured to provide heated compressed supercritical fluid 16 from the heat source, such as the thermal input module 22. The expander 26 is coupled to receive heated compressed supercritical fluid 16 from the heat source and is structured to convert a drop in enthalpy of supercritical fluid 16 to mechanical energy. The cooler 28 is structured to cool expanded supercritical fluid 16 from the recuperator 318A and provide cooled supercritical fluid 16 to the compressor 314A. At least one supercritical fluid supply path 30 is structured to supply supercritical fluid 16 from the supercritical power module 312. At least one supercritical fluid return path 32 is structured to return supercritical fluid 16 to the supercritical power module 312.

It will be appreciated that the compressor 314A and the compressor 314B may be the same as, or substantially similar to, the compressor 14 (FIG. 1), as desired for a particular application. The compressor 314A has an inlet 334A and an outlet 336A, and the compressor 314B has an inlet 334B and an outlet 336B. The compressor 314A and the compressor 314B suitably are operatively coupled to the expander 26 with the shaft 38 in the same manner as discussed above regarding the compressor 14 (FIG. 1).

It will also be appreciated that the recuperator 318A and the recuperator 318B may be the same as, or substantially similar to, the recuperator 18 (FIG. 1), as desired for a particular application. The recuperator 318A has an inlet 342A and an outlet 344A on one side of the heat exchanger of the recuperator 318A, and an inlet 346A and an outlet 348A on the other side of the heat exchanger of the recuperator 318A. The recuperator 318B has an inlet 342B and an outlet 344B on one side of the heat exchanger of the recuperator 318B, and an inlet 346B and an outlet 348B on the other side of the heat exchanger of the recuperator 318B.

The inlet 342A of the recuperator 318A is coupled in fluid communication with the outlet 366A of the compressor 314A. The inlet 342B of the recuperator 318B is coupled in fluid communication with the outlet 344A of the recuperator 318A and the outlet 336B of the compressor 314B. The outlet path 20 is coupled in fluid communication with the outlet 344B of the recuperator 318B. The outlet 50 of the expander 26 is coupled in fluid communication with the inlet 346B of the recuperator 318B. The outlet 348B of the recuperator 318B is coupled in fluid communication with the inlet 346A of the recuperator 318A.

The outlet 348A of the recuperator 318A is coupled in fluid communication with the inlet 52 of the cooler 28 and the inlet 334B of the compressor 314B. As such, the compressor 314A and the compressor 314B compress the supercritical fluid 16 in parallel. A ratio of flow of supercritical fluid 16 to the compressor 314A to flow of supercritical fluid 16 to the compressor 314B may be determined as desired for a particular application.

Other details regarding the supercritical module 312 are the same as those set forth above regarding the supercritical power module 12 (FIG. 1) and need not be repeated for an understanding. It will be appreciated that, similar to the supercritical power module 12 (FIG. 1), the supercritical power module 312 may include more than one expander 26 and more than one electrical power generator 27, as desired for a particular application.

Now that the illustrative modular power infrastructure network 310 and its components have been discussed, operation of embodiments of the modular power infrastructure network 310 will be discussed below with reference to FIG. 4.

Referring additionally to FIG. 4, entropy (in Kj/kg-K) is graphed versus temperature (in degrees K) for a simple recuperated cycle, such as that implemented by the modular power infrastructure network 310. In the discussion below, phases of the thermodynamic cycle illustrated in FIG. 4 are mapped to corresponding components of the modular power infrastructure network 310 that may implement phases associated therewith. Alphabetic references (indicated in FIG. 3 and FIG. 4) are made to relate phases of the cycle illustrated in FIG. 4 to associated components illustrated in FIG. 3.

FIG. 4 graphs a curve 400 of entropy (in Kj/kg-K) along an x-axis versus temperature (in degrees K) along a y-axis. It will be appreciated that values for entropy and temperature are given by way of illustration only and not of limitation. It will be further appreciated that values of entropy and temperature may be affected by amounts of supercritical fluid 16 that may or may not be provided to other modules (not shown in FIGS. 3 and 4) in the modular power infrastructure network as desired for a particular purpose.

Referring now to FIGS. 3 and 4, between points A and B and between points A' and B' temperature of the supercritical fluid 16 is raised in nearly substantially isentropic processes as pressure of the supercritical fluid 16 is raised in the compressor 314A and the compressor 314B, respectively (approximating the well-known relationship PV=nRT). Between points B and B' temperature and enthalpy of the supercritical fluid 16 are raised between the inlet 342A of the recuperator 318A and the outlet 344A of the recuperator 318A. Between points B' and C temperature and enthalpy of the supercritical fluid 16 are raised between the inlet 342B of the recuperator 318B and the outlet 344B of the recuperator 318B. Between points C and D temperature and enthalpy of the supercritical fluid 16 are raised by the heat source, such as the thermal input module 22, between the outlet path 20 and the inlet path 24. Between points D and E temperature and enthalpy of the supercritical fluid 16 are lowered in a nearly substantially isentropic process as the supercritical fluid 16 is expanded, and the pressure thereof is reduced accordingly, in the expander 26. Between points E and V temperature and enthalpy of the supercritical fluid 16 are reduced between the inlet 346B of recuperator 318B and the outlet 348B of the recuperator 318B. Between points F' and F temperature and enthalpy of the supercritical fluid 16 are reduced between the inlet 346A of recuperator 318A and the outlet 348A of the recuperator 318A. Between points F and A temperature and enthalpy of the supercritical fluid 16 are further reduced by the cooler 28.

It will also be appreciated that, as seen in FIG. 4, in some embodiments the supercritical fluid 16 may remain in the supercritical state during all phases of the thermodynamic cycle shown in FIG. 4. However, it will be appreciated that, at one or more points during the process shown along the curve 400 a state other than a supercritical state may exist. Nonetheless, for sake of simplicity, reference is only made to the supercritical fluid 16 as opposed to a fluid having one or more properties other than that of a supercritical fluid. Any one or more of the modules described below with reference to FIGS. 5-15 can be coupled as an external device to the modules 12, 312 described above via the inputs and outputs 30, 32 described above.

Other Modules of Modular Power Infrastructure Networks

Now that illustrative thermodynamic cycles that may be implemented by embodiments of the supercritical power module have been discussed, further modules that may be included in embodiments of modular power infrastructure networks, as desired, will be discussed. As will be appreciated, the other modules may be included in any embodiment of a modular power infrastructure network, as desired, regardless of thermodynamic cycle implemented within the supercritical power module. The other modules described below can help configure different embodiments of modular power infrastructure networks to perform various functions, as desired. As will also be appreciated, the ability to reconfigure various embodiments of modular power infrastructure networks via inclusion of other modules as desired can help contribute to modularity of modular power infrastructure networks.

Figure 5:
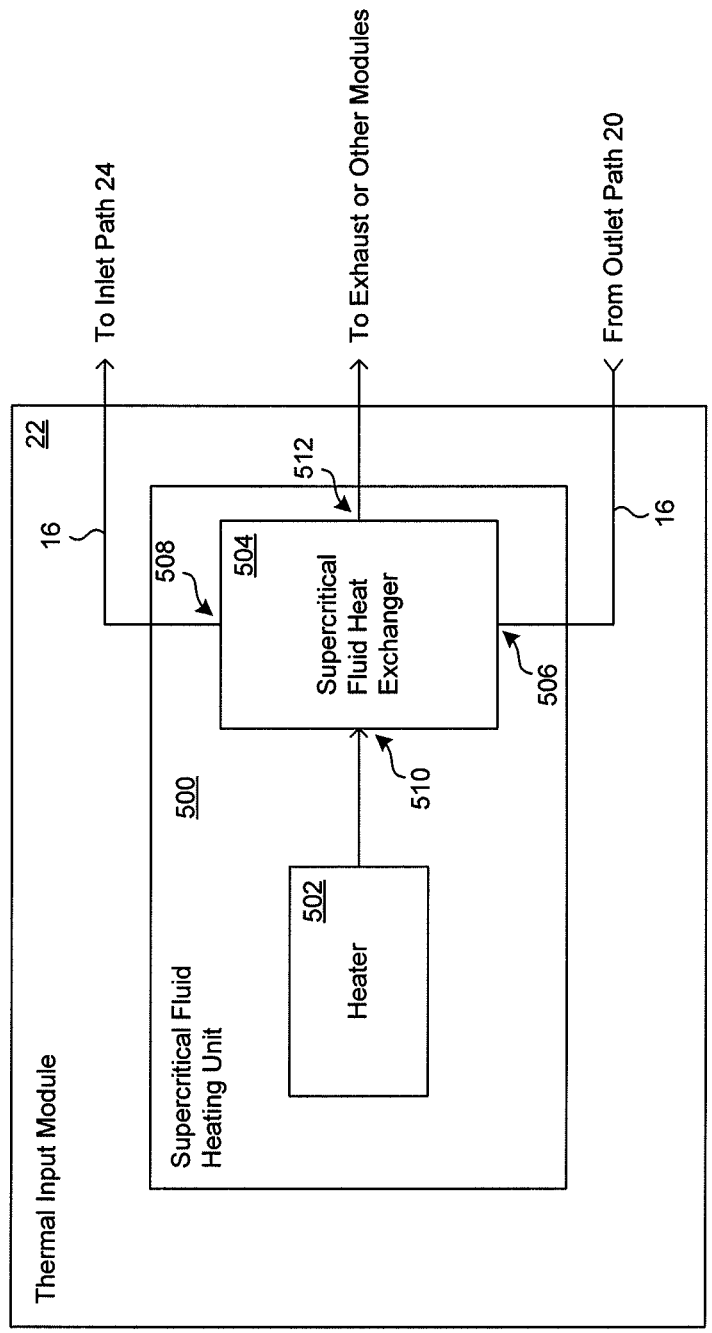
FIG. 5 is a schematic illustration of an illustrative embodiment of a thermal input module.

Referring now to FIGS. 1, 3, and 5, various embodiments of modular power infrastructure networks may include one or more thermal input modules 22. The thermal input module 22 heats supercritical fluid 16 (compressed and supplied by the supercritical power module, regardless of thermodynamic cycle implemented therein) and provides the heated supercritical fluid 16 to the supercritical power module (regardless of thermodynamic cycle implemented therein).

The thermal input module 22 includes a supercritical fluid heating unit 500. The supercritical fluid heating unit 500 suitably generates or collects heat and transfers the heat to the supercritical fluid 16.

The supercritical fluid heating unit 500 includes a heater 502 and a supercritical fluid heat exchanger 504. The heater 502 generates or collects heat. In some embodiments, the heater 502 may collect (and/or concentrate) heat from other sources of heat, such as without limitation geothermal, solar, process heat, waste heat, or the like. In some other embodiments, the heater 502 may generate heat, such as via oxidation or combustion or the like.

The supercritical fluid heat exchanger 504 is operationally coupled in thermal communication with the heater 502 and transfers the heat from the heater 502 to the supercritical fluid 16. The supercritical fluid heat exchanger 504 suitably is any suitable type of heat exchanger, such as a tube-and-shell heat exchanger, a printed circuit heat exchanger, or the like. The supercritical fluid heat exchanger 504 may be implemented using any suitable flow orientation as desired, such as a cross-flow orientation, a counter-flow orientation, or a parallel-flow orientation. The supercritical fluid heat exchanger 504 suitably is sized to have a selected heat transfer capacity as desired for a particular application.

One side of the supercritical fluid heat exchanger 504 has an inlet 506 that may be coupled in fluid communication to receive supercritical fluid 16 from the outlet path 20 and an outlet 508 that may be coupled in fluid communication to provide heated supercritical fluid 16 to the inlet path 24.

Another side of the supercritical fluid heat exchanger 504 has an inlet 510 coupled to receive heat from the heater 502 and an outlet 512. The outlet 512 can exhaust to ambient or can be coupled to any other suitable module or modules as desired to supply waste thereto.

It will be appreciated that some embodiments of modular power infrastructure networks may include one thermal input module 22 and some other embodiments of modular power infrastructure networks may include more than one thermal input module 22, as desired for a particular application. It will also be appreciated that various embodiments of the thermal input module 22 may include more than one heater 502. In such embodiments, the heaters 502 may be different sources or collectors/concentrators of heat, discussed above, that may be combined with each other. Also, it will be appreciated that various embodiments of the thermal input module 22 may include more than one supercritical fluid heat exchanger 504, as desired for a particular application.

Figure 6:
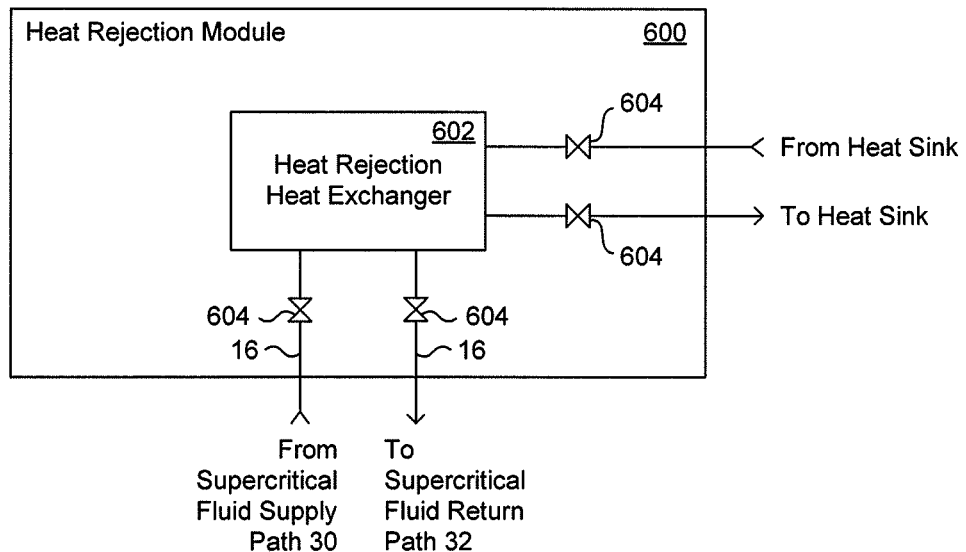
FIG. 6 is a schematic illustration of an illustrative embodiment of a heat rejection module.

Referring now to FIGS. 1, 3, and 6, various embodiments of modular power infrastructure networks may include one or more heat rejection modules 600. In such embodiments, the heat rejection module 600 allows transfer of heat from the supercritical fluid 16 supplied from embodiments of the supercritical power module (regardless of thermodynamic cycle implemented therein) to a heat sink (not shown) having a bulk temperature below that of the supercritical fluid 16 supplied to the heat rejection module 600. Given by way of non-limiting example, transfer of heat from the supercritical fluid 16 supplied from embodiments of the supercritical power module to the heat sink may be desirable to help increase efficiency of pumping or compression of the supercritical fluid 16. To that end, transfer of heat from the supercritical fluid 16 supplied from embodiments of the supercritical power module to the heat sink reduces enthalpy of the supercritical fluid 16, thereby increasing density of the supercritical fluid 16, which can help increase efficiency of pumping or compression of the supercritical fluid 16.

Embodiments of the heat rejection module 600 include at least one heat rejection heat exchanger 602. The heat rejection heat exchanger 602 may be any suitable type of heat exchanger as desired for a particular application. In some embodiments, it may be desired simply to transfer heat from the supercritical fluid 16 supplied from embodiments of the supercritical power module to the heat sink. In some such cases, the heat sink may be a reservoir like a large body of water (such as a lake, a river, an ocean, or the like) having a bulk temperature below that of the supercritical fluid 16 and the heat rejection heat exchanger 602 may be any acceptable heat exchanger such as a shell-and-tube heat exchanger, a printed circuit heat exchanger, or the like. In other such cases, the heat sink may be ambient air and the heat rejection heat exchanger 602 may be any acceptable heat exchanger structured to provide for evaporative cooling (such as, for example, a heat exchanger configured to spray a liquid onto cooling coils). In other such cases, the heat rejection heat exchanger 602 may be a radiator in which the heat sink is ambient air that is blown past coils through which the supercritical fluid 16 flows.

In some other embodiments, the heat sink may be a reservoir of fluid, having a bulk temperature below that of the supercritical fluid 16, to which it is desired to transfer heat from the supercritical fluid 16 and raise the bulk temperature for a desired purpose. In such cases and given by way of non-limiting examples, embodiments of the supercritical power module (regardless of thermodynamic cycle implemented therein) may be capable of providing heat otherwise unutilized therein to serve external systems requiring thermal input, such as without limitation district heating, residential heating, commercial heating, industrial heating, structural heating, process heating, or the like.

Each supply and return line to and from both sides of the heat rejection heat exchanger 602 may include an isolation valve 604. In some embodiments, if desired connections between the heat rejection module 600 and other modules, such as those at terminations of the supercritical fluid supply path 30 and the supercritical fluid return path 32, may be made with "quick disconnect"-type fittings, thereby helping contribute to modularity of the modular power infrastructure network. Also, if desired, in some embodiments the supercritical fluid 16 from the heat rejection heat exchanger 602 may be provided to any other suitable module for heating (and ultimate return to the supercritical fluid return path 32), as desired, instead of being returned directly to the supercritical fluid return path 32.

Figure 7:
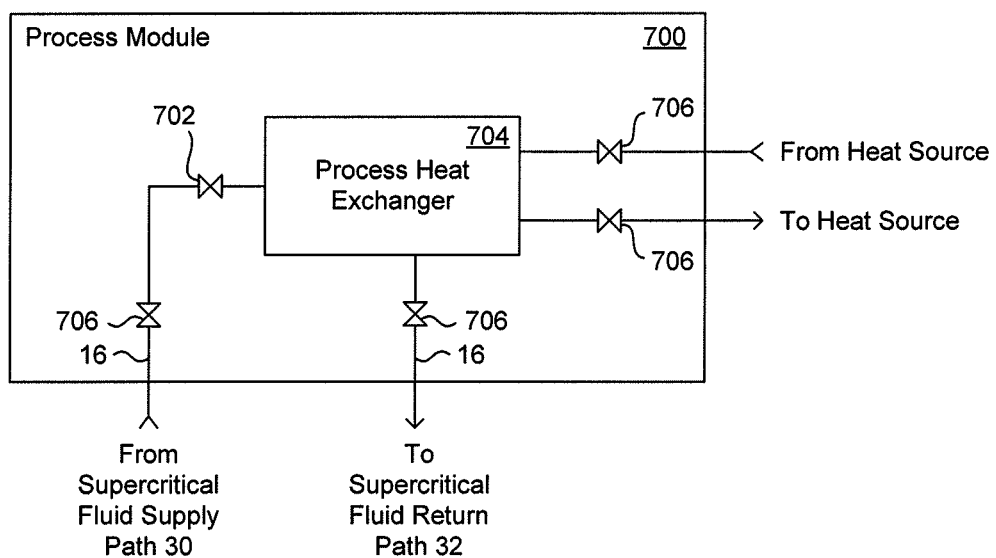
FIG. 7 is a schematic illustration of an illustrative embodiment of a process module.

Referring now to FIGS. 1, 3, and 7, various embodiments of modular power infrastructure networks may include one or more process modules 700. In such embodiments, the process module 700 allows transfer of heat from fluid supplied by a heat source (not shown) to the supercritical fluid 16 supplied from embodiments of the supercritical power module (regardless of thermodynamic cycle implemented therein), thereby cooling the fluid supplied by a heat source.

Embodiments of the process module 700 include at least one expansion device 702, such as without limitation an expansion valve or the like, and at least one process heat exchanger 704. The process heat exchanger 704 may be any suitable type of heat exchanger as desired for a particular application, such as a shell-and-tube heat exchanger, a printed circuit heat exchanger, or the like. The expansion device 702 expands the supercritical fluid 16, thereby lowering pressure and causing a drop in enthalpy (and a resultant drop in temperature). In the process heat exchanger 704 heat is transferred from fluid supplied by the heat source (and having a bulk temperature above that of the supercritical fluid 16 that has been expanded by the expansion device 702) to the supercritical fluid 16 that has been expanded by the expansion device 702.

The process module 700 may be used to provide cooling of fluid from any suitable heat source as desired for a particular application, such as without limitation computational facilities, HVAC system, process cooling, building and structure cooling, and the like.

Each supply and return line to and from both sides of the process heat exchanger 704 may include an isolation valve 706. In some embodiments, if desired connections between the process module 700 and other modules, such as those at terminations of the supercritical fluid supply path 30 and the supercritical fluid return path 32, may be made with "quick disconnect"-type fittings, thereby helping contribute to modularity of the modular power infrastructure network. Also, if desired, in some embodiments the supercritical fluid 16 from the process heat exchanger 704 may be provided to any other suitable module for cooling (and ultimate return to the supercritical fluid return path 32), as desired, instead of being returned directly to the supercritical fluid return path 32.

Figure 8:
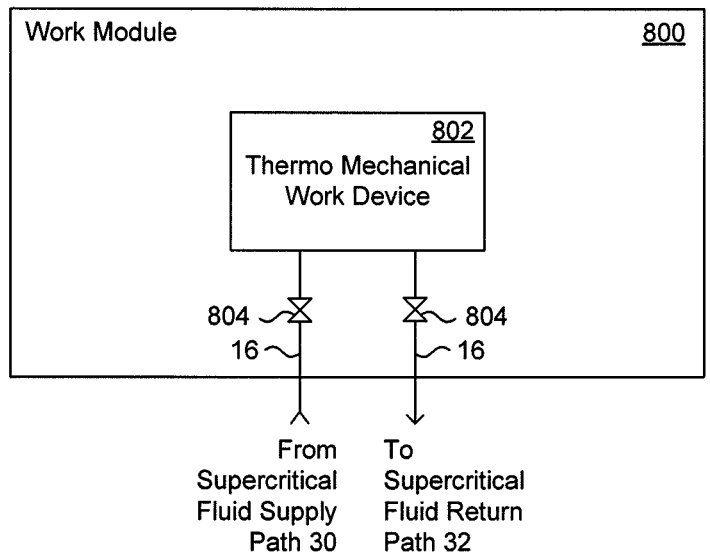
FIG. 8 is a schematic illustration of an illustrative embodiment of a work module.

Referring now to FIGS. 1, 3, and 8, various embodiments of modular power infrastructure networks may include one or more work modules 800. In such embodiments, the work module 800 includes at least one thermo mechanical work device 802 converts energy of the supercritical fluid 16 supplied from embodiments of the supercritical power module (regardless of thermodynamic cycle implemented therein) to mechanical work or electrical work, as desired for a particular application.

In some embodiments and given by way of non-limiting example, it may be desirable for the work module 800 to provide mechanical work in the form of rotational mechanical energy. In such embodiments, the thermo mechanical work device 802 may include an expander, such as a turbine, that expands the supercritical fluid 16 and converts a drop in enthalpy of the supercritical fluid 16 to rotational mechanical energy. Given by way of example and not of limitation, suitable turbines may include a turbo-expander, an expansion turbine, a centrifugal turbine, an axial flow turbine, and/or the like. Given by way of non-limiting example, in such cases the thermo mechanical work device 802 may rotationally drive a drill bit that is coupled to the thermo mechanical work device 802 (in this case, a turbine) with an appropriate shaft and any suitable gearing, as desired, for applications such as without limitation mining, construction, fossil fuel exploration, fossil fuel extraction, industrial or commercial applications, and the like. Given by way of another non-limiting example, the thermo mechanical work device 802 may rotationally drive an end effector, such as a buffer or the like, for industrial or commercial applications as desired. Regardless of whether rotational mechanical energy provided by the thermo mechanical work device 802 is used to rotationally drive any suitable mechanical work device attached thereto as discussed above, in some embodiments the thermo mechanical work device 802 may rotationally drive one or more suitable electrical power generators, thereby producing electricity as desired.

In some other embodiments and given by way of non-limiting example, it may be desirable for the work module 800 to provide mechanical work in the form of axial mechanical energy. In such embodiments, the thermo mechanical work device 802 may include an expander, such as a reciprocating engine, that expands the supercritical fluid 16 and converts a drop in enthalpy of the supercritical fluid 16 to axial mechanical energy. Given by way of non-limiting example, in such cases the thermo mechanical work device 802 may axially drive a hammer or a pile driver bit that is coupled to the thermo mechanical work device 802 (in this case, a reciprocating engine) with an appropriate, as desired, for applications such as without limitation mining, construction, fossil fuel exploration, fossil extraction, industrial or commercial applications, and the like. Regardless of whether axial mechanical energy provided by the thermo mechanical work device 802 is used to axially drive any suitable mechanical work device attached thereto as discussed above, in some embodiments the thermo mechanical work device 802 may axially drive one or more suitable electrical power generators, thereby producing electricity as desired.

In some embodiments, it may be desirable for the work module 800 to provide mechanical work in the form of rotational mechanical energy and axial mechanical energy. In such embodiments, at least one thermo mechanical work device 802 may include an expander, such as a turbine as discussed above, that expands the supercritical fluid 16 and converts a drop in enthalpy of the supercritical fluid 16 to rotational mechanical energy and an expander, such as a reciprocating engine, that expands the supercritical fluid 16 and converts a drop in enthalpy of the supercritical fluid 16 to axial mechanical energy. Given by way of example and not of limitation, such an illustrative thermo mechanical work device 802 (or thermo mechanical work devices 802) may be used to axially and rotationally drive a combination hammer/drill. Regardless of whether axial and rotational mechanical energy provided by the thermo mechanical work device 802 is used to axially drive any suitable mechanical work device attached thereto as discussed above, in some embodiments the thermo mechanical work device 802 may axially drive one or more suitable electrical power generators and/or may rotationally drive one or more suitable electrical power generators, thereby producing electricity as desired.

Regardless of whether or the work module 800 provides any suitable mechanical work, in various embodiments one or more thermo mechanical work devices 802 may include one or more thermoelectric generators. In such cases, the thermoelectric generator converts heat from the supercritical fluid 16 directly into electrical energy, using a phenomenon called the "Seebeck effect" (or "thermoelectric effect").

Each supply and return line to and from the thermo mechanical work device 802 may include an isolation valve 804. In some embodiments, if desired connections between the work module 800 and other modules, such as those at terminations of the supercritical fluid supply path 30 and the supercritical fluid return path 32, may be made with "quick disconnect"-type fittings, thereby helping contribute to modularity of the modular power infrastructure network. Also, if desired, in some embodiments the supercritical fluid 16 from the thermo mechanical work device 802 may be provided to any other suitable module for heating, cooling, or conversion to work (and ultimate return to the supercritical fluid return path 32), as desired, instead of being returned directly to the supercritical fluid return path 32.

In various embodiments of modular power infrastructure networks, various modules may be combined as desired for a particular application. It will be appreciated that such combinations may be made regardless of thermodynamic cycle implemented by the supercritical power module.

Figure 9:
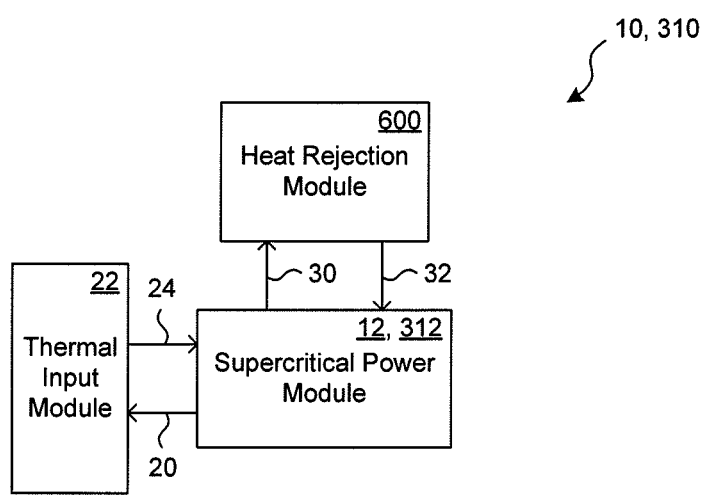
FIGS. 9-15 are schematic illustrations of illustrative embodiments of modular power infrastructure networks.

To that end, and referring now to FIG. 9, in some embodiments an illustrative modular power infrastructure network 10, 310 may include at least one supercritical power module 12, 312, at least one thermal input module 22 coupled in fluid communication with the at least one supercritical power module 12, 312 via the outlet path 20 and the inlet path 24, and at least one heat rejection module 600 coupled in fluid communication with the at least one supercritical power module 12, 312 via the supercritical fluid supply path 30 and the supercritical fluid return path 32. Such an embodiment may provide combined heating and power ("CHP"), as desired for a particular application.

Figure 10:
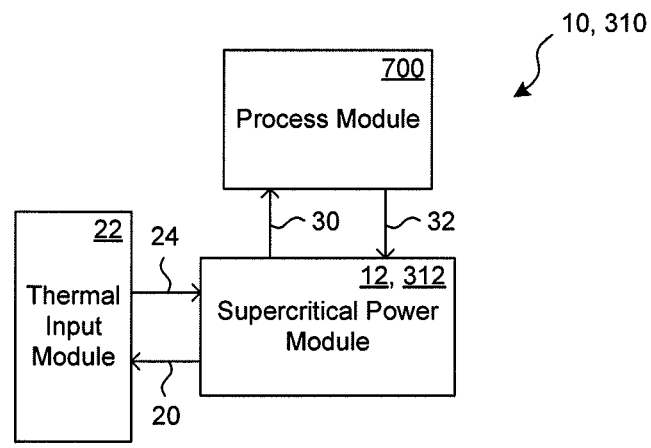

Referring now to FIG. 10, in some embodiments an illustrative modular power infrastructure network 10, 310 may include at least one supercritical power module 12, 312, at least one thermal input module 22 coupled in fluid communication with the at least one supercritical power module 12, 312 via the outlet path 20 and the inlet path 24, and at least one process module 700 coupled in fluid communication with the at least one supercritical power module 12, 312 via the supercritical fluid supply path 30 and the supercritical fluid return path 32. Such an embodiment may provide combined cooling and power ("CCP"), as desired for a particular application.

Figure 11:
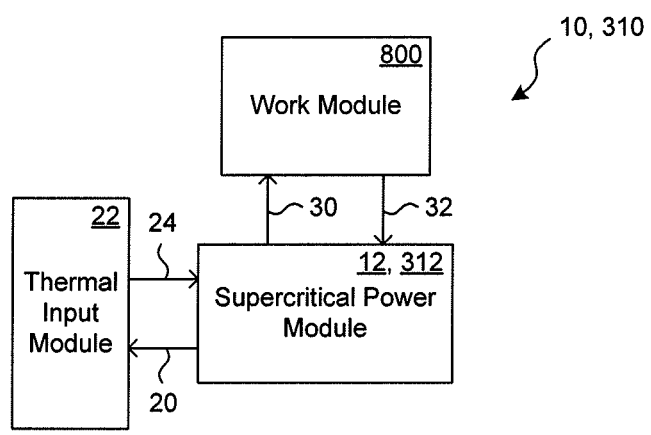

Referring now to FIG. 11, in some embodiments an illustrative modular power infrastructure network 10, 310 may include at least one supercritical power module 12, 312, at least one thermal input module 22 coupled in fluid communication with the at least one supercritical power module 12, 312 via the outlet path 20 and the inlet path 24, and at least one work module 800 coupled in fluid communication with the at least one supercritical power module 12, 312 via the supercritical fluid supply path 30 and the supercritical fluid return path 32.

Figure 12:
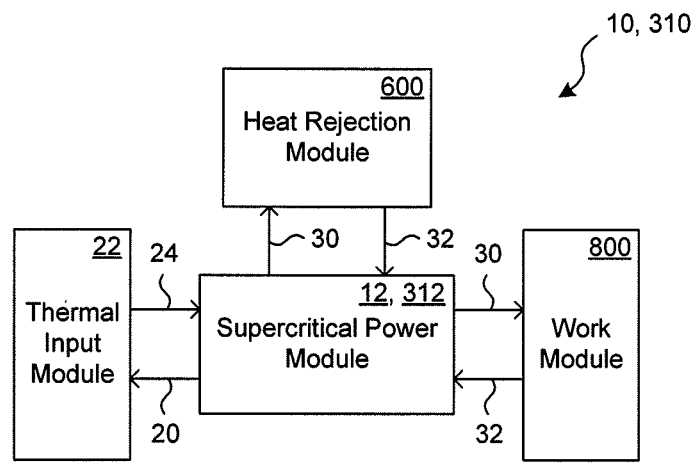

Referring now to FIG. 12, in some embodiments an illustrative modular power infrastructure network 10, 310 may include at least one supercritical power module 12, 312, at least one thermal input module 22 coupled in fluid communication with the at least one supercritical power module 12, 312 via the outlet path 20 and the inlet path 24, at least one heat rejection module 600 coupled in fluid communication with the at least one supercritical power module 12, 312 via the supercritical fluid supply path 30 and the supercritical fluid return path 32, and at least one work module 800 coupled in fluid communication with the at least one supercritical power module 12, 312 via the supercritical fluid supply path 30 and the supercritical fluid return path 32. Such an embodiment may provide CHP, as desired for a particular application.

Figure 13:
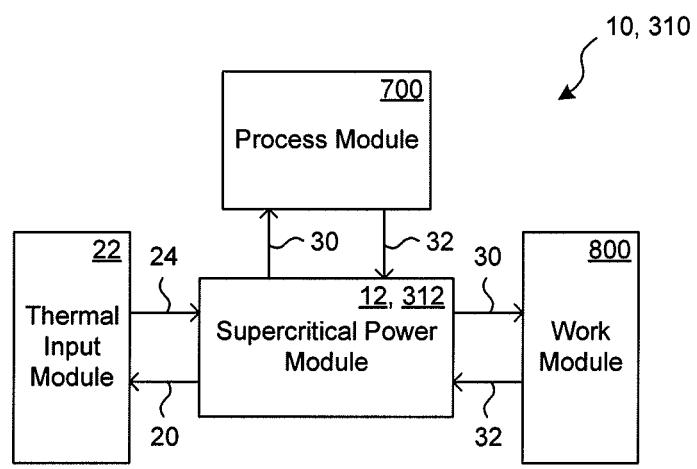

Referring now to FIG. 13, in some embodiments an illustrative modular power infrastructure network 10, 310 may include at least one supercritical power module 12, 312, at least one thermal input module 22 coupled in fluid communication with the at least one supercritical power module 12, 312 via the outlet path 20 and the inlet path 24, at least one process module 700 coupled in fluid communication with the at least one supercritical power module 12, 312 via the supercritical fluid supply path 30 and the supercritical fluid return path 32, and at least one work module 800 coupled in fluid communication with the at least one supercritical power module 12, 312 via the supercritical fluid supply path 30 and the supercritical fluid return path 32. Such an embodiment may provide CCP, as desired for a particular application.

Figure 14:
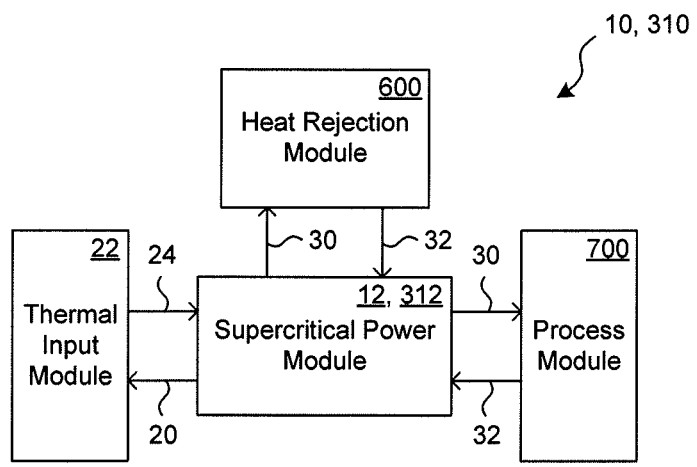

Referring now to FIG. 14, in some embodiments an illustrative modular power infrastructure network 10, 310 may include at least one supercritical power module 12, 312, at least one thermal input module 22 coupled in fluid communication with the at least one supercritical power module 12, 312 via the outlet path 20 and the inlet path 24, at least one heat rejection module 600 coupled in fluid communication with the at least one supercritical power module 12, 312 via the supercritical fluid supply path 30 and the supercritical fluid return path 32, and at least one process module 700 coupled in fluid communication with the at least one supercritical power module 12, 312 via the supercritical fluid supply path 30 and the supercritical fluid return path 32. Such an embodiment may provide combined heating, cooling, and power ("CHCP"), as desired for a particular application.

Figure 15:
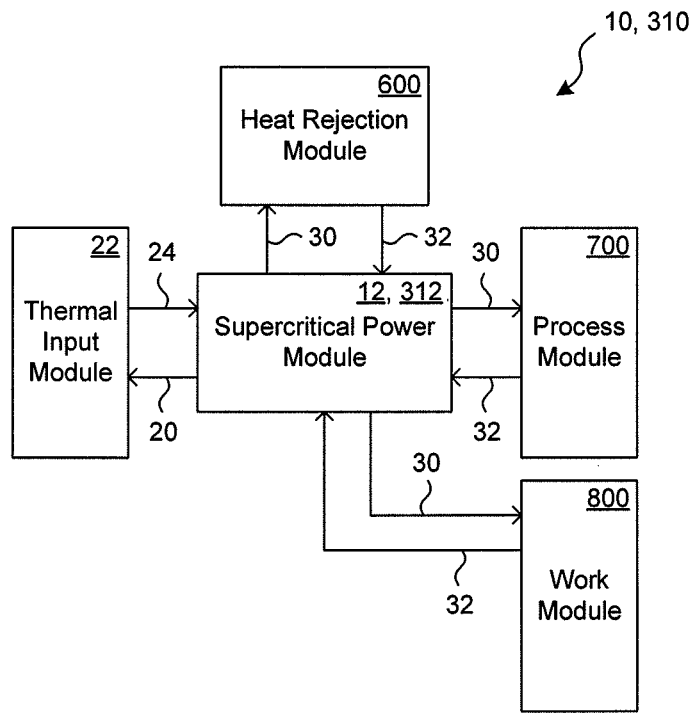

Referring now to FIG. 15, in some embodiments an illustrative modular power infrastructure network 10, 310 may include at least one supercritical power module 12, 312, at least one thermal input module 22 coupled in fluid communication with the at least one supercritical power module 12, 312 via the outlet path 20 and the inlet path 24, at least one heat rejection module 600 coupled in fluid communication with the at least one supercritical power module 12, 312 via the supercritical fluid supply path 30 and the supercritical fluid return path 32, at least one process module 700 coupled in fluid communication with the at least one supercritical power module 12, 312 via the supercritical fluid supply path 30 and the supercritical fluid return path 32, and at least one work module 800 coupled in fluid communication with the at least one supercritical power module 12, 312 via the supercritical fluid supply path 30 and the supercritical fluid return path 32. Such an embodiment may provide CHCP, as desired for a particular application.

Figure 16:
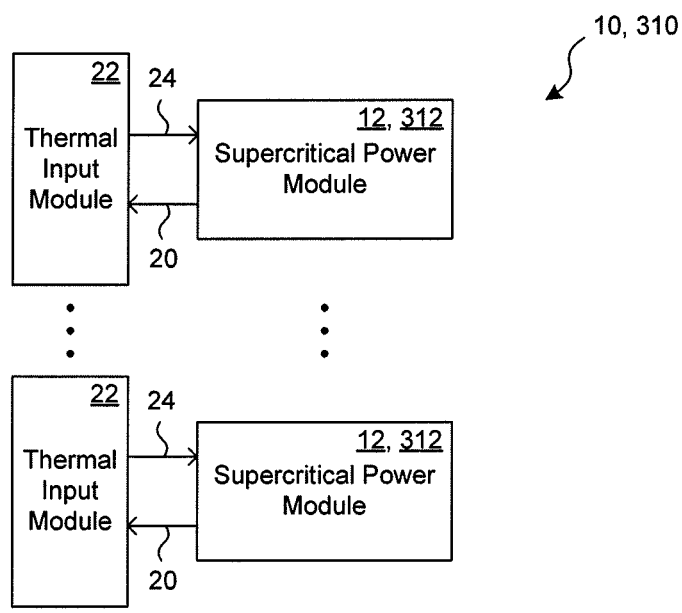
FIGS. 16-18 are schematic illustrations of illustrative embodiments of distributed electrical power infrastructure networks.
Figure 17:
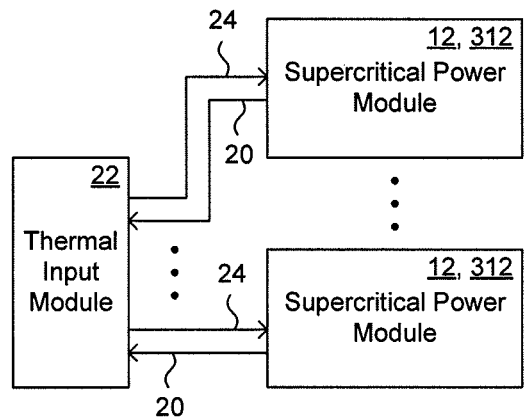
Figure 18:
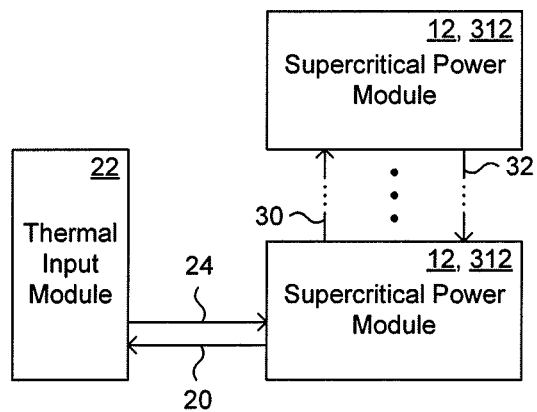

Referring now to FIGS. 16-18, it will be appreciated that embodiments of the modular power infrastructure network 10, 310 may provide for distributed electrical power generation and/or a distributed electrical power grid infrastructure (regardless of thermodynamic cycle implemented in any supercritical power module 10, 310) (collectively referred to herein as "distributed electrical power infrastructure networks"). Illustrative distributed electrical power infrastructure networks may include at least one thermal input module 22 and two or more supercritical power modules 10, 310 (regardless of thermodynamic cycle implemented therein) that each include at least one electrical power generator 27 (not shown in FIGS. 16-18). Embodiments of distributed electrical power infrastructure networks may generate and distribute electrical power for applications including without limitation grid-scale electrical utilities, local utilities, microgrids, computational facilities and equipment, motors, mines, military bases, remote power, transportation equipment, batteries, flywheels, and the like.

It will be appreciated that supercritical fluid may be heated and distributed as desired in various embodiments of distributed electrical power infrastructure networks. As a non-limiting example and as shown in FIG. 16, each thermal input module 22 may be coupled in fluid communication directly with an associated supercritical power module 10, 310 via outlet paths 20 and inlet paths 24. As another non-limiting example and as shown in FIG. 17, one thermal input module 22 may be coupled in fluid communication directly with more than one supercritical power module 10, 310 via outlet paths 20 and inlet paths 24. As another non-limiting example and as shown in FIG. 18, one thermal input module 22 may be coupled in fluid communication directly with one supercritical power module 10, 310 via outlet paths 20 and inlet paths 24, which in turn may be coupled in fluid communication directly with another supercritical power module 10, 310 via the supercritical fluid supply path 30 and the supercritical fluid return path 32. It will also be appreciated that, while not shown in FIGS. 16-18, embodiments of distributed electrical power infrastructure networks may include any one or more heat rejection module 600, process module 700, and/or work module 800 as desired for a particular application.

Illustrative Methods

Now that illustrative embodiments of modular power infrastructure networks and distributed electrical power infrastructure networks have been discussed, illustrative methods will be discussed by way of non-limiting examples. Embodiments of the methods may be used in association with embodiments of the modular power infrastructure networks 10 and 310 and distributed electrical power infrastructure networks disclosed above. Details of the modular power infrastructure networks 10 and 310 and distributed electrical power infrastructure networks disclosed above have been set forth above, are incorporated by this reference, and need not be repeated for an understanding of embodiments of the illustrative methods.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 19A:
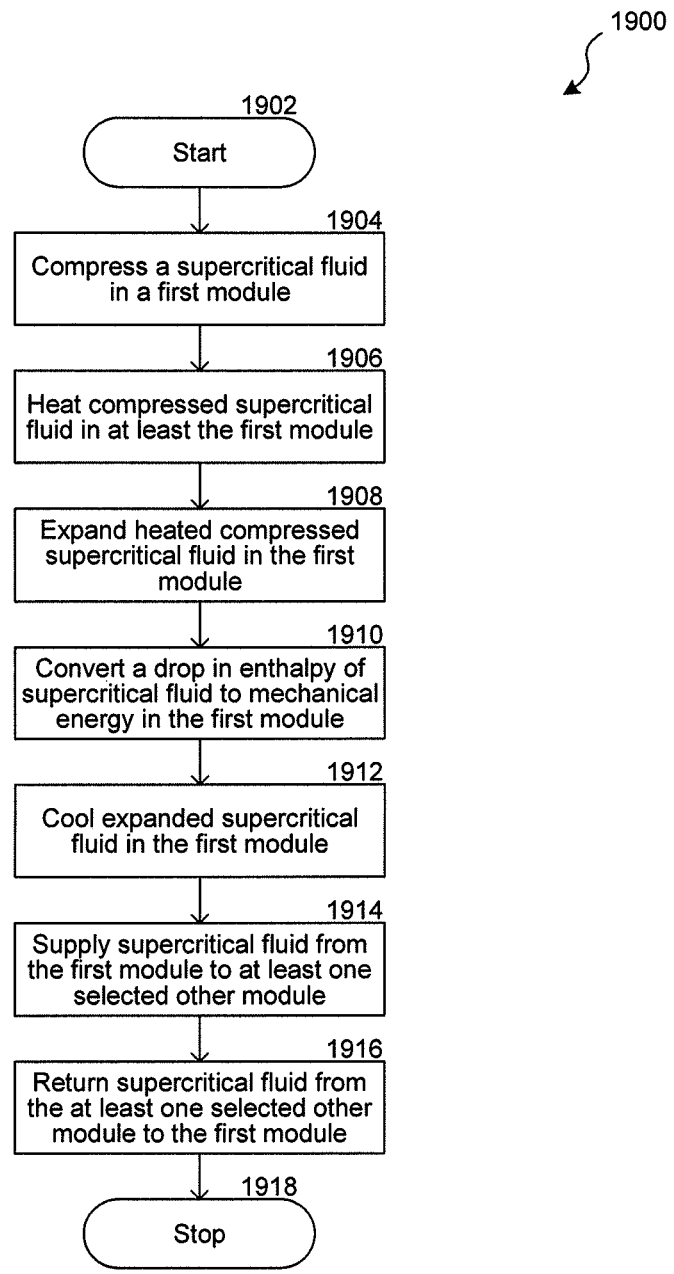
FIG. 19A is a flowchart of an illustrative method of operating a modular power infrastructure network.

Referring now to FIG. 19A, in an embodiment an illustrative method 1900 is provided for operating a modular power infrastructure network. The method 1900 starts at a block 1902. At a block 1904 a supercritical fluid is compressed in a first module. At a block 1906 the compressed supercritical fluid is heated in at least the first module. At a block 1908 the heated compressed supercritical fluid is expanded in the first module. At a block 1910 a drop in enthalpy of supercritical fluid is converted to mechanical energy in the first module. At a block 1912 expanded supercritical fluid is cooled in the first module. At a block 1914 supercritical fluid is supplied from the first module to at least one selected other module. At a block 1916 supercritical fluid is returned from the at least one selected other module to the first module. The method 1900 stops at a block 1918.

Figure 19B:
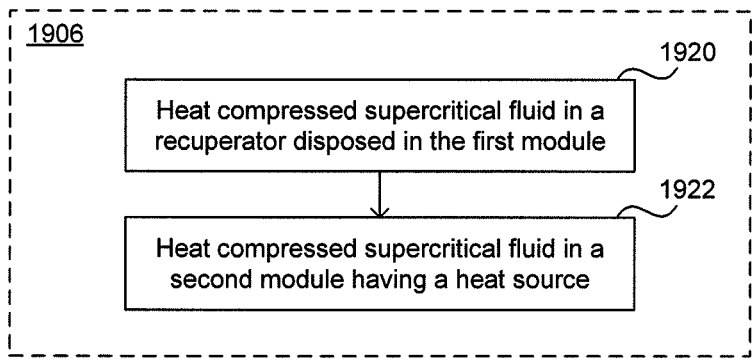
FIGS. 19B-19G illustrate details of the method of the flowchart of FIG. 19A.

Referring additionally to FIG. 19B, in some embodiments heating compressed supercritical fluid in at least the first module at the block 1906 may include heating compressed supercritical fluid in a recuperator disposed in the first module at a block 1920 and heating compressed supercritical fluid in a second module having a heat source at a block 1922.

Figure 19C:
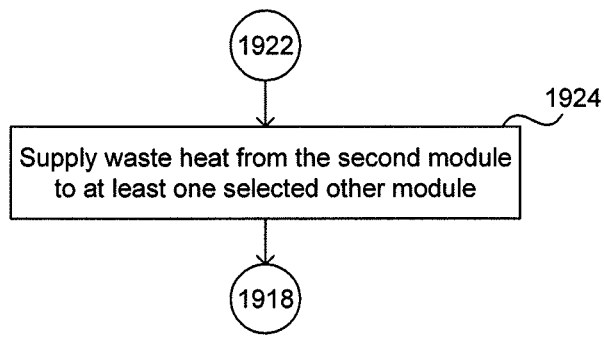

Referring additionally to FIG. 19C, in some embodiments at a block 1924 waste heat may be supplied from the second module to at least one selected other module.

Figure 19D:
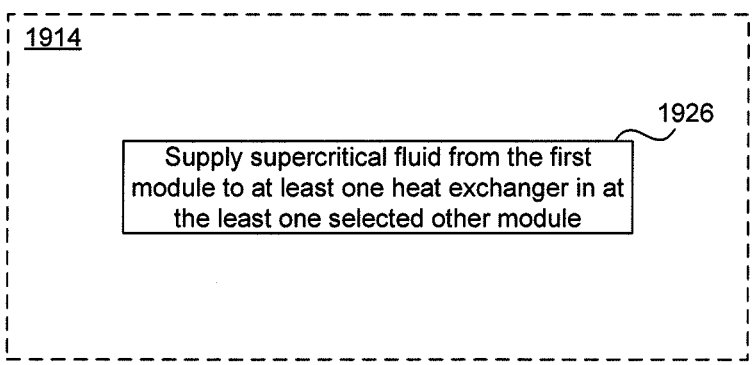

Referring additionally to FIG. 19D, in some embodiments supplying supercritical fluid from the first module to at least one selected other module at the block 1914 may include supplying supercritical fluid from the first module to at least one heat exchanger in the at least one selected other module at a block 1926.

Figure 19E:
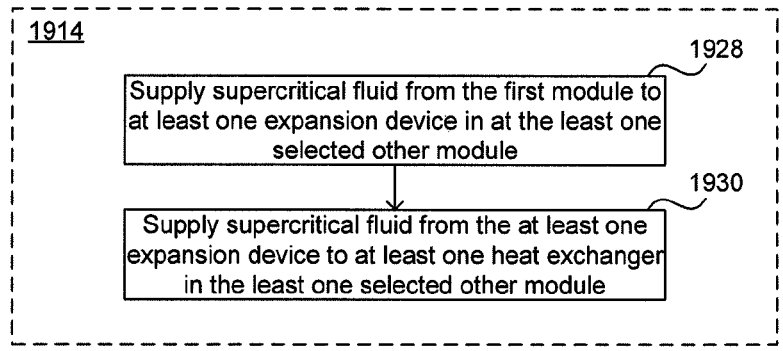

Referring additionally to FIG. 19E, in some embodiments supplying supercritical fluid from the first module to at least one selected other module at the block 1914 may include supplying supercritical fluid from the first module to at least one expansion device in the at least one selected other module at a block 1928 and supplying supercritical fluid from the at least one expansion device to at least one heat exchanger in the at least one selected other module at a block 1930.

Figure 19F:
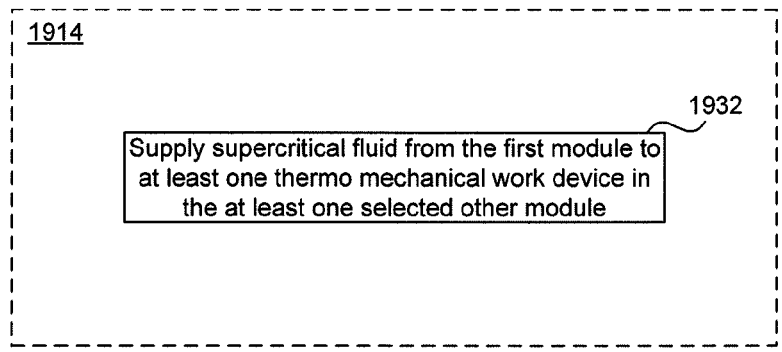

Referring additionally to FIG. 19F, in some embodiments supplying supercritical fluid from the first module to at least one selected other module at the block 1914 may include supplying supercritical fluid from the first module to at least one thermo mechanical work device in the at least one selected other module at a block 1932.

Figure 19G:
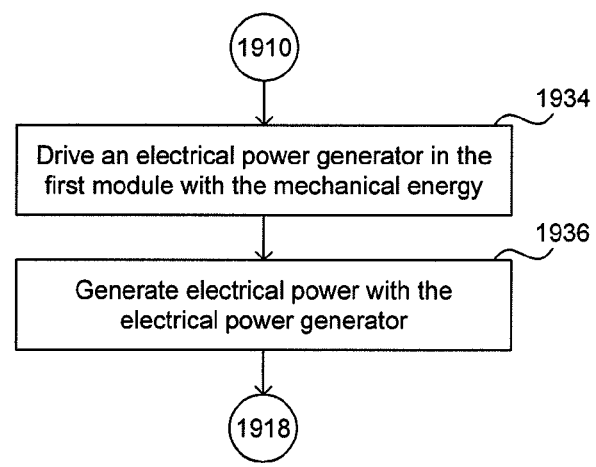

Referring additionally to FIG. 19G, in some embodiments at a block 1934 an electrical power generator may be driven in the first module with the mechanical energy and at a block 1936 electrical power may be generated with the electrical power generator.

Figure 20A:
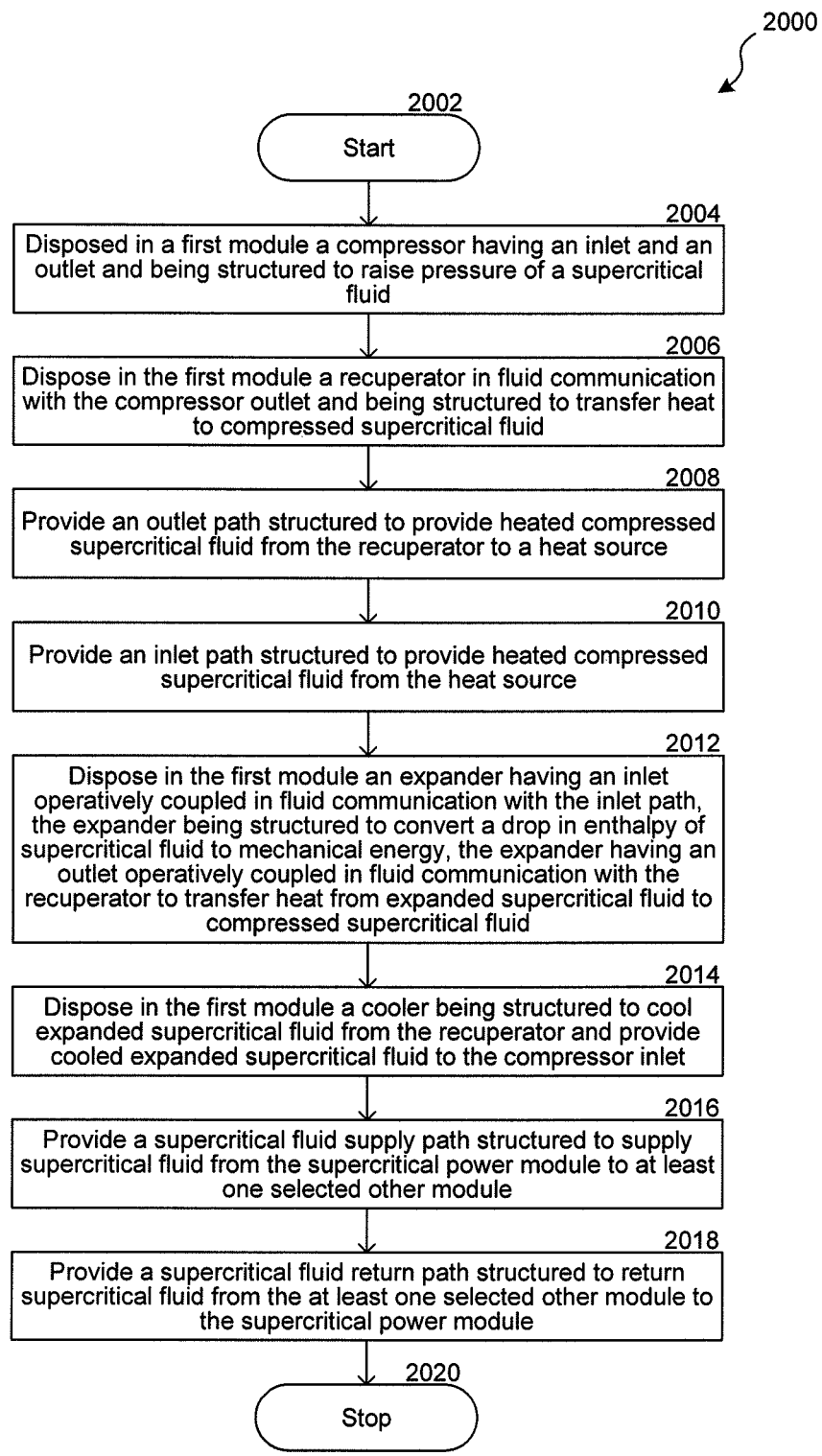
FIG. 20A is a flowchart of an illustrative method of fabricating a modular power infrastructure network.

Referring now to FIG. 20A, in an embodiment an illustrative method 2000 of fabricating a modular power infrastructure network is provided. The method 2000 starts at a block 2002. At a block 2004 a compressor having an inlet and an outlet and being structured to raise pressure of a supercritical fluid is disposed a first module. At a block 2006 a recuperator in fluid communication with the compressor outlet and being structured to transfer heat to compressed supercritical fluid is disposed in the first module. At a block 2008 an outlet path structured to provide heated compressed supercritical fluid from the recuperator to a heat source is provided. At a block 2010 an inlet path structured to provide heated compressed supercritical fluid from the heat source is provided. At a block 2012 an expander having an inlet operatively coupled in fluid communication with the inlet path is disposed in the first module, the expander being structured to convert a drop in enthalpy of supercritical fluid to mechanical energy, the expander having an outlet operatively coupled in fluid communication with the recuperator to transfer heat from expanded supercritical fluid to compressed supercritical fluid. At a block 2014 a cooler being structured to cool expanded supercritical fluid from the recuperator and provide cooled expanded supercritical fluid to the compressor inlet is disposed in the first module. At a block 2016 a supercritical fluid supply path structured to supply supercritical fluid from the supercritical power module to at least one selected other module is provided. At a block 2018 a supercritical fluid return path structured to return supercritical fluid from the at least one selected other module to the supercritical power module is provided. The method 2000 stops at a block 2020.

Figure 20B:
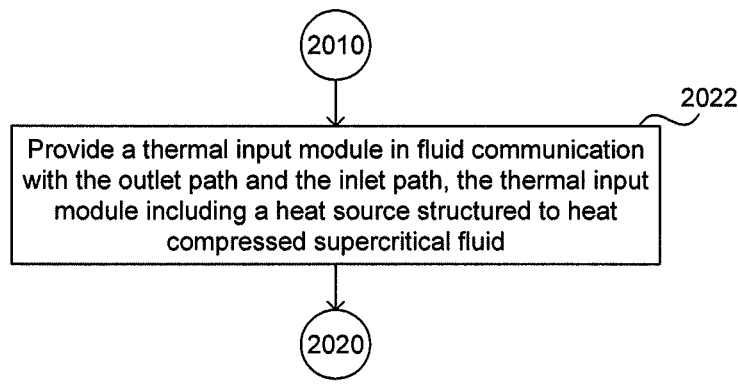
FIGS. 20B-20G illustrate details of the method of the flowchart of FIG. 20A.

Referring additionally to FIG. 20B, in some embodiments at a block 2022 a thermal input module may be provided in fluid communication with the outlet path and the inlet path, the thermal input module including a heat source structured to heat compressed supercritical fluid.

Figure 20C:
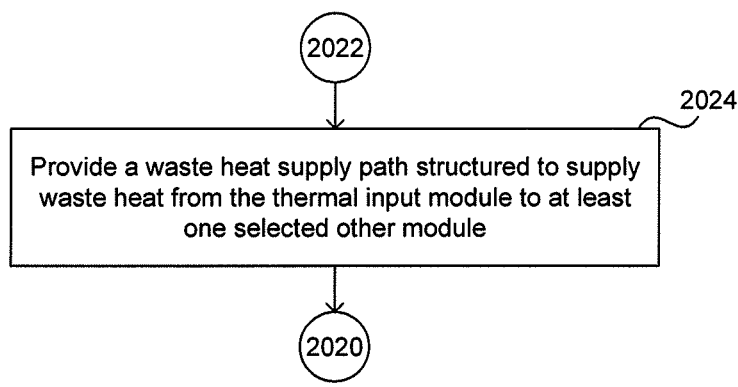

Referring additionally to FIG. 20C, in some embodiments at a block 2024 a waste heat supply path structured to supply waste heat from the thermal input module to at least one selected other module may be provided.

Figure 20D:
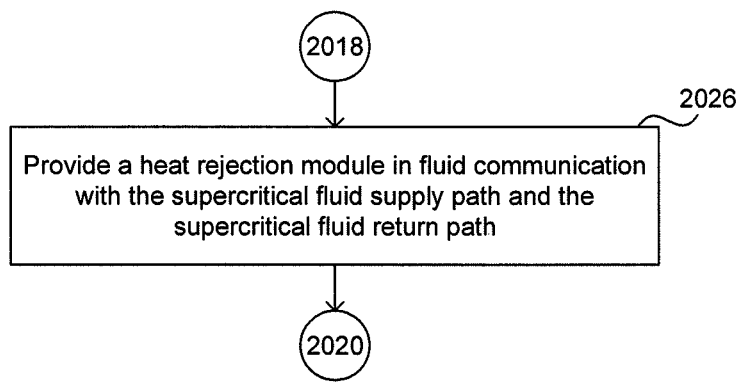

Referring additionally to FIG. 20D, in some embodiments at a block 2026 a heat rejection module may be provided in fluid communication with the supercritical fluid supply path and the supercritical fluid return path.

Figure 20E:
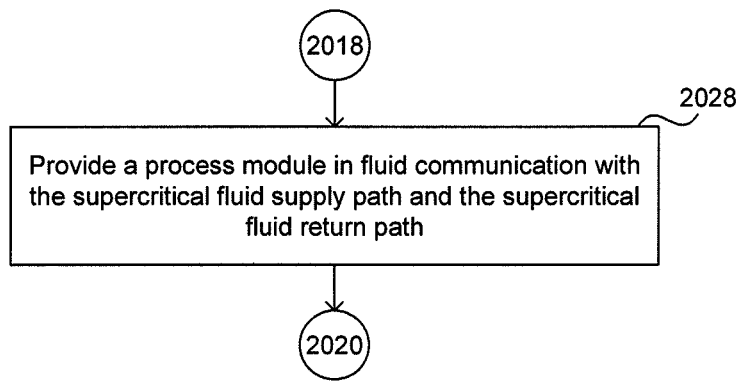

Referring additionally to FIG. 20E, in some embodiments at a block 2028 a process module may be provided in fluid communication with the supercritical fluid supply path and the supercritical fluid return path.

Figure 20F:
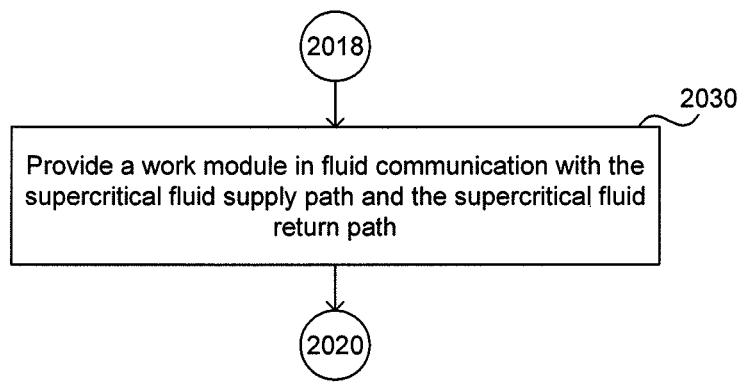

Referring additionally to FIG. 20F, in some embodiments at a block 2030 a work module may be provided in fluid communication with the supercritical fluid supply path and the supercritical fluid return path.

Figure 20G:
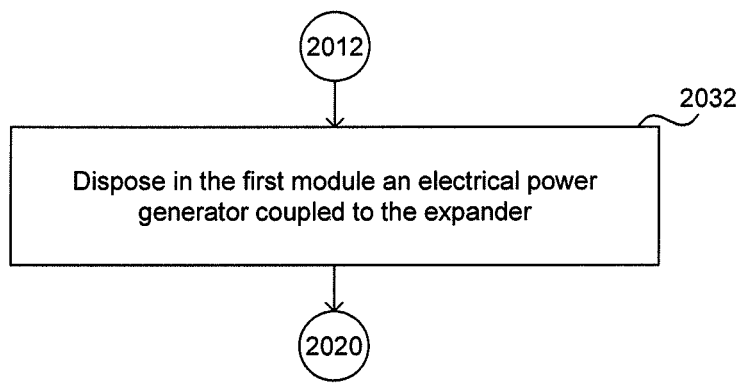

Referring additionally to FIG. 20G, in some embodiments at a block 2032 an electrical power generator coupled to the expander may be provided.

Figure 21A:
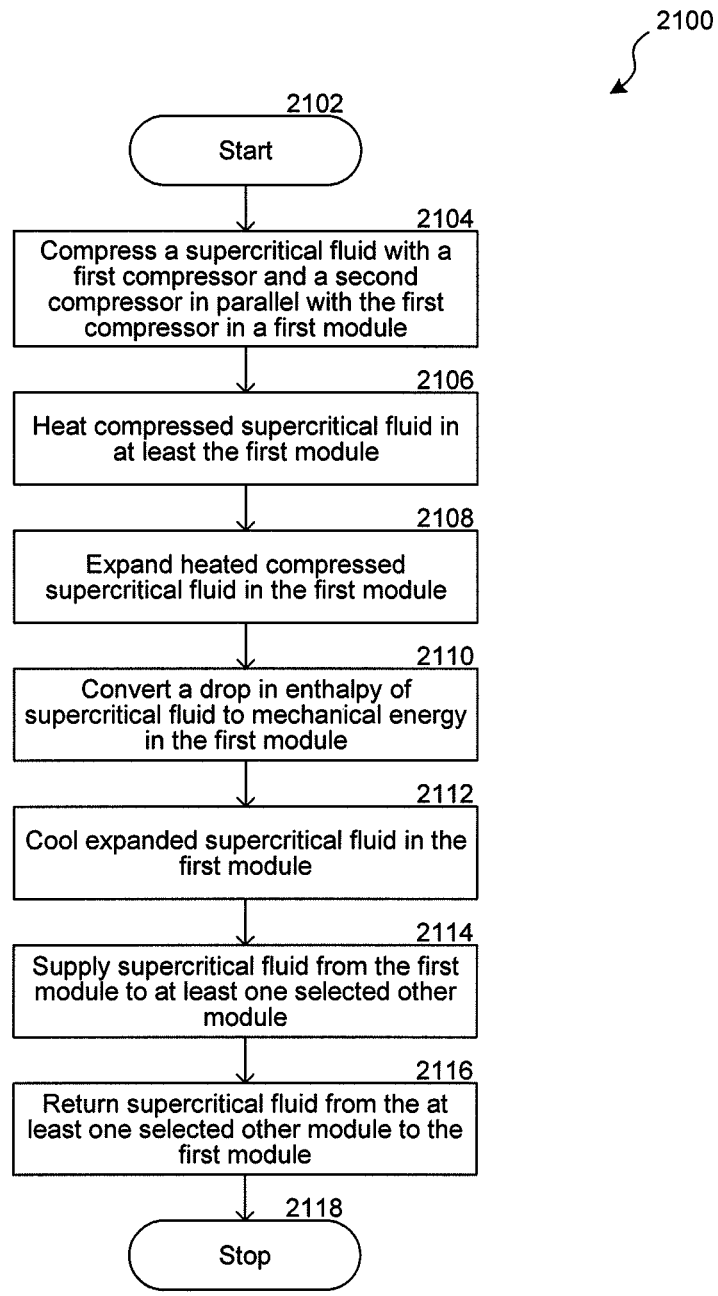
FIG. 21A is a flowchart of another illustrative method of operating a modular power infrastructure network.

Referring now to FIG. 21A, in an embodiment an illustrative method 2100 is provided for operating a modular power infrastructure network. The method 2100 starts at a block 2102. At a block 2104 a supercritical fluid is compressed with a first compressor and a second compressor in parallel with the first compressor in a first module. At a block 2106 compressed supercritical fluid is heated in at least the first module. At a block 2108 heated compressed supercritical fluid is expanded in the first module. At a block 2110 a drop in enthalpy of supercritical fluid is converted to mechanical energy in the first module. At a block 2112 expanded supercritical fluid is cooled in the first module. At a block 2114 supercritical fluid is supplied from the first module to at least one selected other module. At a block 2116 supercritical fluid is returned from the at least one selected other module to the first module. The method 2100 stops at a block 2118.

Figure 21B:
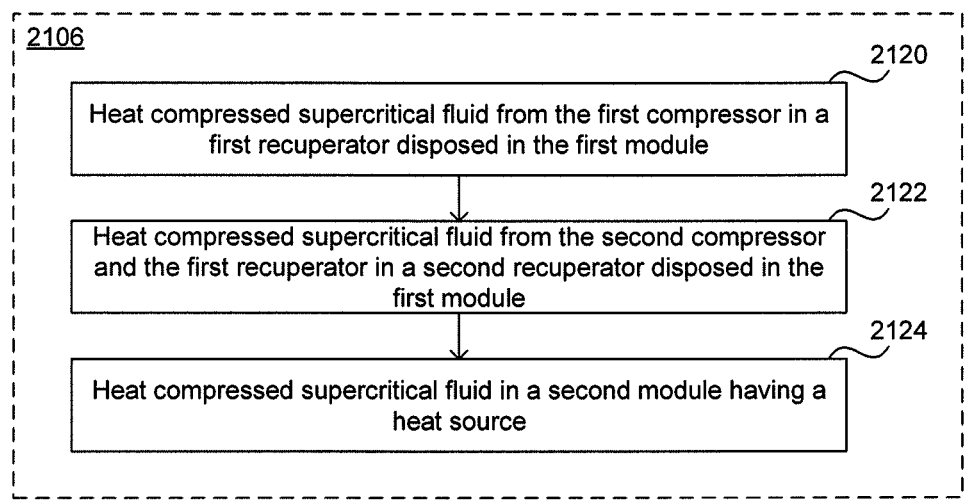
FIGS. 21B-21G illustrate details of the method of the flowchart of FIG. 21A.

Referring additionally to FIG. 21B, in some embodiments heating compressed supercritical fluid in at least the first module at the block 2106 may include heating compressed supercritical fluid from the first compressor in a first recuperator disposed in the first module at a block 2120, heating compressed supercritical fluid from the second compressor and the first recuperator in a second recuperator disposed in the first module at a block 2122, and heating compressed supercritical fluid in a second module having a heat source at a block 2124.

Figure 21C:
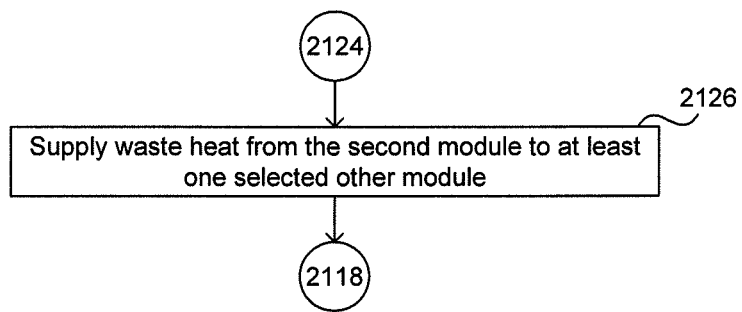

Referring additionally to FIG. 21C, in some embodiments at a block 2126 waste heat may be supplied from the second module to at least one selected other module.

Figure 21D:
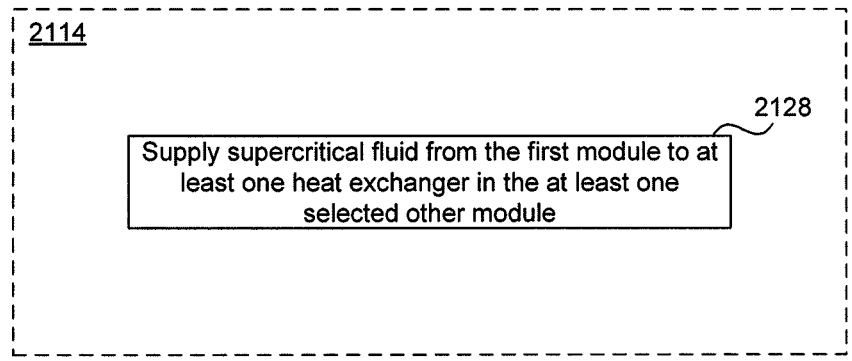

Referring additionally to FIG. 21D, in some embodiments supplying supercritical fluid from the first module to at least one selected other module at the block 2114 may include supplying supercritical fluid from the first module to at least one heat exchanger in the at least one selected other module at a block 2128.

Figure 21E:
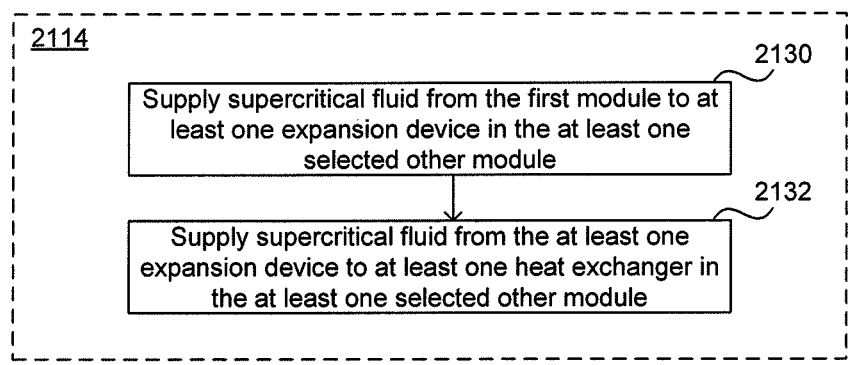

Referring additionally to FIG. 21E, in some embodiments supplying supercritical fluid from the first module to at least one selected other module at the block 2114 may include supplying supercritical fluid from the first module to at least one expansion device in the at least one selected other module at a block 2130 and supplying supercritical fluid from the at least one expansion device to at least one heat exchanger in the at least one selected other module at a block 2132.

Figure 21F:
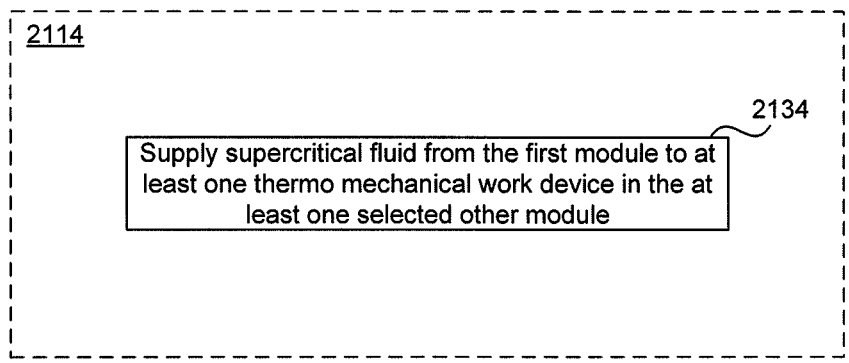

Referring additionally to FIG. 21F, in some embodiments supplying supercritical fluid from the first module to at least one selected other module at the block 2114 may include supplying supercritical fluid from the first module to at least one thermo mechanical work device in the at least one selected other module at a block 2134.

Figure 21G:
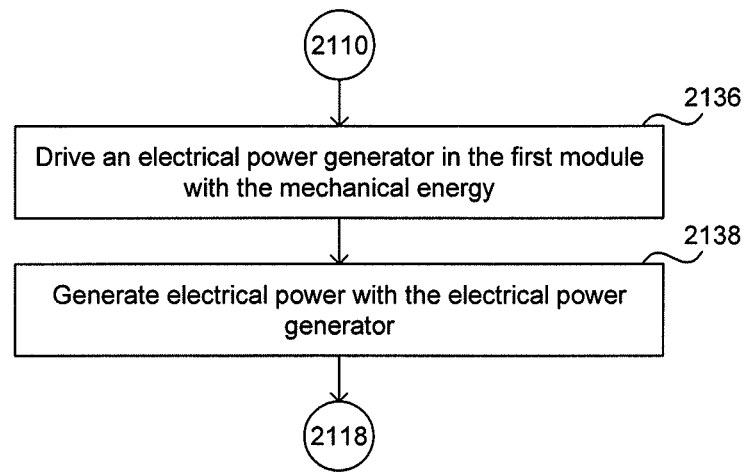

Referring additionally to FIG. 21G, in some embodiments at a block 2136 an electrical power generator in the first module may be driven with the mechanical energy and at a block 2138 electrical power may be generated with the electrical power generator.

Figure 22:
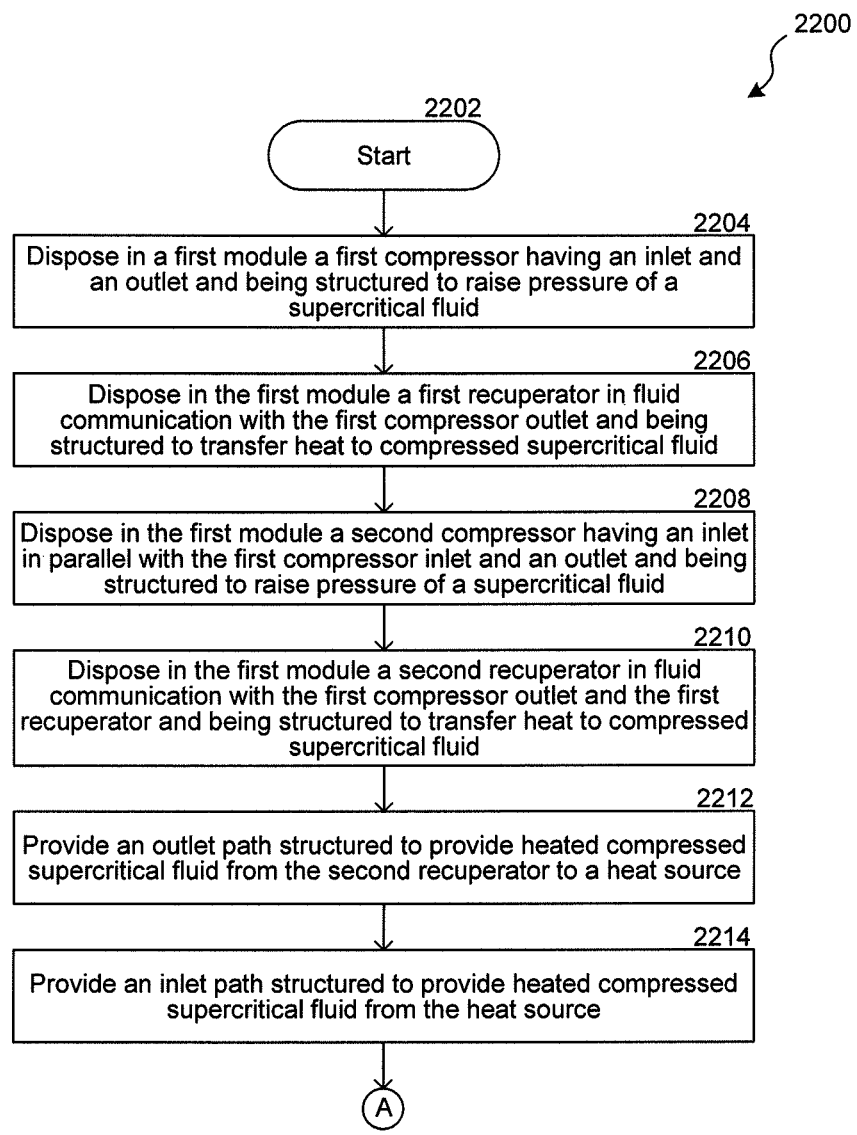
FIG. 22 is a flowchart of an illustrative method of fabricating a modular power infrastructure network.

Referring now to FIG. 22[ ], in an embodiment an illustrative method 2200 of fabricating a modular power infrastructure network is provided. The method 2200 starts at a block 2202. At a block 2204 a first compressor having an inlet and an outlet and being structured to raise pressure of a supercritical fluid is disposed in a first module. At a block 2206 a first recuperator in fluid communication with the first compressor outlet and being structured to transfer heat to compressed supercritical fluid is disposed in the first module. At a block 2208 a second compressor having an inlet in parallel with the first compressor inlet and an outlet and being structured to raise pressure of a supercritical fluid is disposed in the first module. At a block 2210 a second recuperator in fluid communication with the first compressor outlet and the first recuperator and being structured to transfer heat to compressed supercritical fluid is disposed in the first module. At a block 2212 an outlet path structured to provide heated compressed supercritical fluid from the second recuperator to a heat source is provided. At a block 2214 an inlet path structured to provide heated compressed supercritical fluid from the heat source is provided. At a block 2216 an expander having an inlet operatively coupled in fluid communication with the inlet path is disposed in the first module, the expander being structured to convert a drop in enthalpy of supercritical fluid to mechanical energy, the expander having an outlet operatively coupled in fluid communication with the second recuperator to transfer heat from expanded supercritical fluid to compressed supercritical fluid. At a block 2218 a cooler being structured to cool expanded supercritical fluid from the first recuperator and provide cooled expanded supercritical fluid to the first compressor inlet is disposed in the first module. At a block 2220 a supercritical fluid supply path structured to supply supercritical fluid from the supercritical power module to at least one selected other module is supplied. At a block 2222 a supercritical fluid return path structured to return supercritical fluid from the at least one selected other module to the supercritical power module is provided. The method 2200 stops at a block 2224.

Figure 22A:
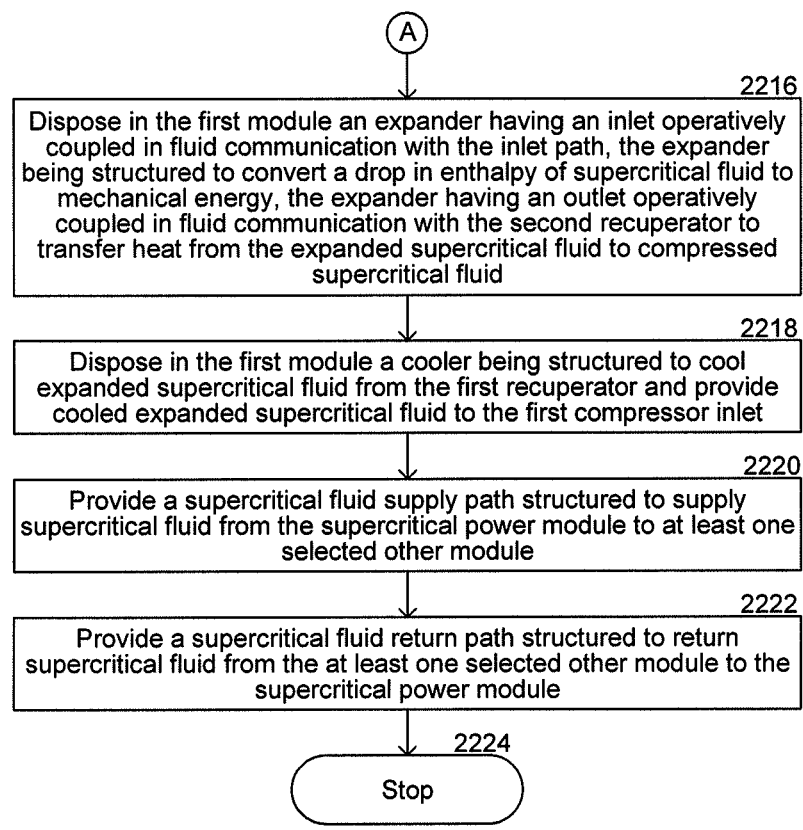
FIG. 22A is a continuation of the illustrative method shown in FIG. 22

Referring now to FIG. 22A, this figure is a continuation of the illustrative method shown in FIG. 22.

Figure 22B:
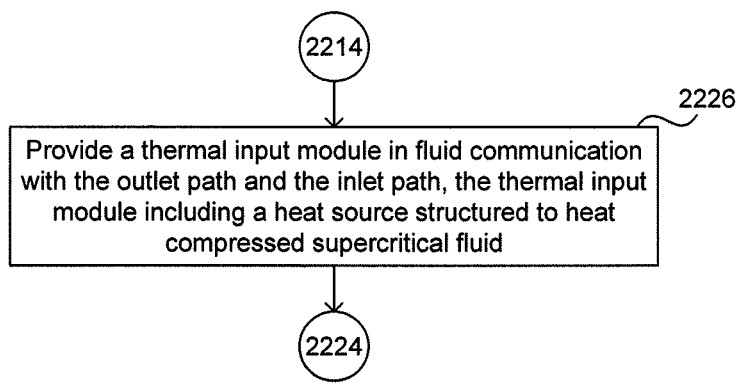
FIGS. 22B-22G illustrate details of the method of the flowchart of FIGS. 22 and 22A.

Referring now to FIG. 22B, in some embodiments at a block 2226 a thermal input module in fluid communication with the outlet path and the inlet path may be provided, the thermal input module including a heat source structured to heat compressed supercritical fluid.

Figure 22C:
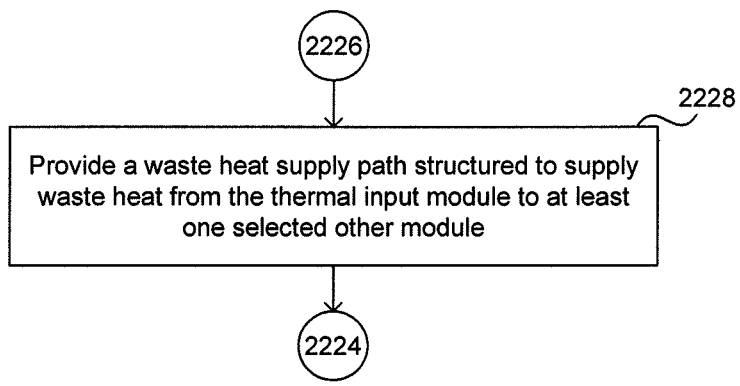

Referring now to FIG. 22C, in some embodiments at a block 2228 a waste heat supply path structured to supply waste heat from the thermal input module to at least one selected other module may be provided.

Figure 22D:
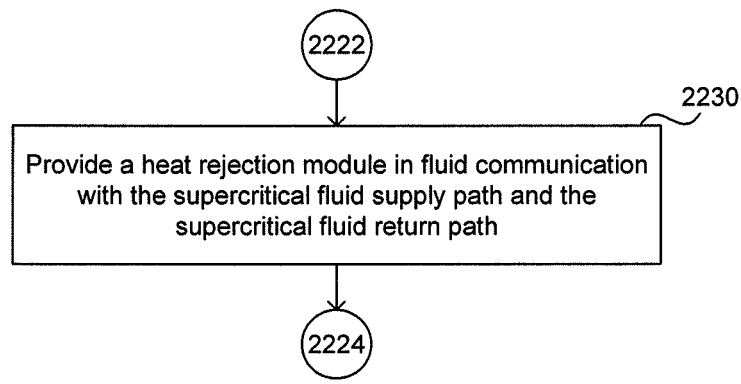

Referring now to FIG. 22D, in some embodiments at a block 2230 a heat rejection module in fluid communication with the supercritical fluid supply path and the supercritical fluid return path may be provided.

Figure 22E:
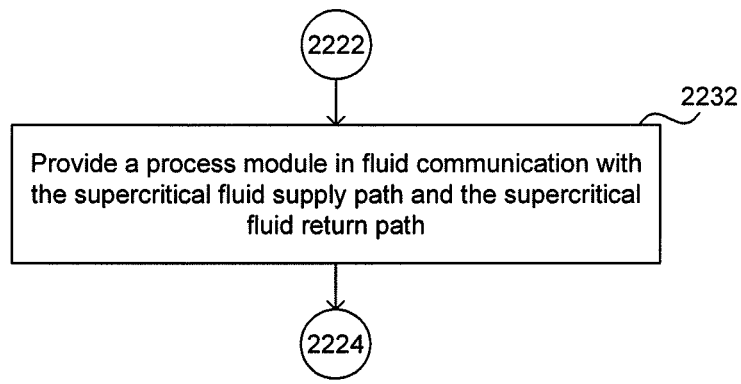

Referring now to FIG. 22E, in some embodiments at a block 2232 a process module in fluid communication with the supercritical fluid supply path and the supercritical fluid return path may be provided.

Figure 22F:
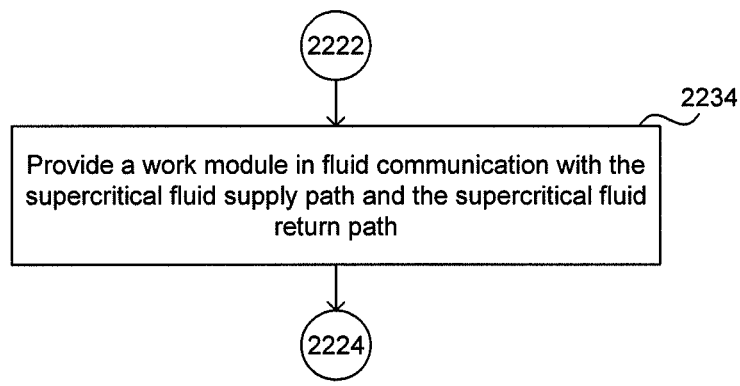

Referring now to FIG. 22F, in some embodiments at a block 2234 a work module in fluid communication with the supercritical fluid supply path and the supercritical fluid return path may be provided.

Figure 22G:
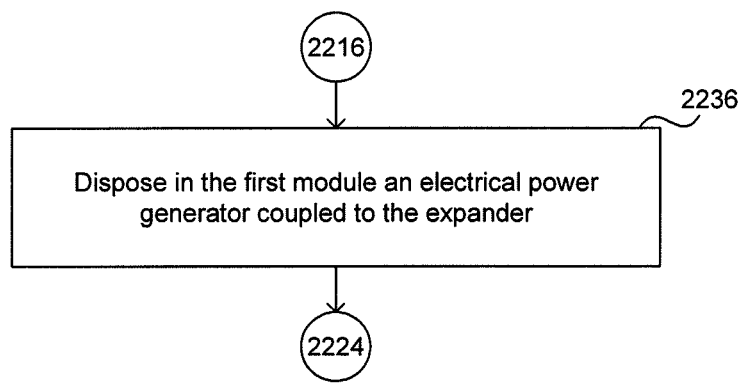

Referring now to FIG. 22G, in some embodiments at a block 2236 an electrical power generator coupled to the expander may be disposed in the first module.

The following U.S. Applications, filed concurrently herewith, are incorporated herein by reference: U.S. patent application Ser. No. 13/843,517, titled "THERMODYNAMIC CYCLE WITH COMPRESSOR RECUPERATION, AND ASSOCIATED SYSTEMS AND METHODS" and U.S. patent application Ser. No. 13/843,668, titled "SYSTEMS AND METHODS FOR PART LOAD CONTROL OF ELECTRICAL POWER GENERATING SYSTEMS".

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any suitable order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A modular power infrastructure system comprising:
    a supercritical power module including:
        a compressor structured to compress a supercritical fluid;
        a recuperator structured to heat compressed supercritical fluid;
        an outlet path structured to provide heated compressed supercritical fluid from the recuperator to a heat source;
        an inlet path structured to provide heated compressed supercritical fluid from the heat source;
        an expander coupled to receive heated compressed supercritical fluid from the heat source and structured to convert a drop in enthalpy of supercritical fluid to mechanical energy;
        a cooler structured to cool expanded supercritical fluid from the expander and provide cooled supercritical fluid to the compressor;
        a supercritical fluid supply path structured to supply supercritical fluid from the supercritical power module;
        a supercritical fluid return path structured to return supercritical fluid to the supercritical power module; and
    a process module in fluid communication with the supercritical fluid supply path and the supercritical fluid return path, wherein the process module includes an expansion device and a heat exchanger.

2. The modular power infrastructure system of claim 1, further comprising a thermal input module in fluid communication with the outlet path and the inlet path, the thermal input module including a heat source structured to heat compressed supercritical fluid.

3. The modular power infrastructure system of claim 2, wherein the thermal input module further includes a waste heat supply path structured to supply waste heat from the thermal input module to at least one selected other module.

4. The modular power infrastructure system of claim 1, wherein the supercritical power module further includes an electrical power generator coupled to the expander.

5. The modular power infrastructure system of claim 1, wherein the expander includes a device chosen from a reciprocating engine, an axial flow turbine, and a radial flow turbine.

6. A modular power infrastructure system comprising:
    a supercritical power module including:
        a first compressor structured to compress a supercritical fluid;
        a first recuperator structured to heat compressed supercritical fluid from the first compressor;
        a second compressor structured to compress a supercritical fluid in parallel with the first compressor;
        a second recuperator structured to heat compressed supercritical fluid from the first compressor and the second compressor;
        an outlet path structured to provide heated compressed supercritical fluid from the second recuperator to a heat source;
        an inlet path structured to provide heated compressed supercritical fluid from the heat source;
        an expander coupled to receive heated compressed supercritical fluid from the heat source and structured to convert a drop in enthalpy of supercritical fluid to mechanical energy;
        a cooler structured to cool expanded supercritical fluid from the first recuperator and provide cooled supercritical fluid to the first compressor;
        a supercritical fluid supply path structured to supply supercritical fluid from the supercritical power module;
        a supercritical fluid return path structured to return supercritical fluid to the supercritical power module; and
    a process module in fluid communication with the supercritical fluid supply path and the supercritical fluid return path, wherein the process module includes an expansion device and a heat exchanger.

7. The modular power infrastructure system of claim 6, further comprising a thermal input module in fluid communication with the outlet path and the inlet path, the thermal input module including a heat source structured to heat compressed supercritical fluid.

8. The modular power infrastructure system of claim 7, wherein the thermal input module further includes a waste heat supply path structured to supply waste heat from the thermal input module to at least one selected other module.

9. The modular power infrastructure system of claim 6, wherein the supercritical power module further includes an electrical power generator coupled to the expander.

10. The modular power infrastructure system of claim 6, wherein the expander includes a device chosen from a reciprocating engine, an axial flow turbine, and a radial flow turbine.

11. A modular power infrastructure system comprising:
a supercritical power module including:
a compressor structured to compress a supercritical fluid;
a recuperator structured to heat compressed supercritical fluid;
an outlet path structured to provide heated compressed supercritical fluid from the recuperator to a heat source;
an inlet path structured to provide heated compressed supercritical fluid from the heat source;
an expander coupled to receive heated compressed supercritical fluid from the heat source and structured to convert a drop in enthalpy of supercritical fluid to mechanical energy;
a cooler structured to cool expanded supercritical fluid from the expander and provide cooled supercritical fluid to the compressor;
a supercritical fluid supply path structured to supply supercritical fluid from the supercritical power module;
a supercritical fluid return path structured to return supercritical fluid to the supercritical power module; and
a heat rejection module in fluid communication with the supercritical fluid supply path and the supercritical fluid return path;
wherein the supercritical supply path and the supercritical return path are coupled to the supercritical power module at one of the following locations:
between an outlet of the compressor and a first inlet of the recuperator;
between a first outlet of the recuperator and the outlet path;
between the inlet path and an inlet of the expander;
between an outlet of the expander and a second inlet of the recuperator;
between a second outlet of the recuperator and an inlet of the cooler; or
between an outlet of the cooler and an inlet of the compressor.

12. The modular power infrastructure system of claim 11, further comprising a thermal input module in fluid communication with the outlet path and the inlet path, the thermal input module including a heat source structured to heat compressed supercritical fluid.

13. The modular power infrastructure system of claim 12, wherein the thermal input module further includes a waste heat supply path structured to supply waste heat from the thermal input module to at least one selected other module.

14. The modular power infrastructure system of claim 11, wherein the heat rejection module includes a heat exchanger.

15. The modular power infrastructure system of claim 11, wherein the supercritical power module further includes an electrical power generator coupled to the expander.

16. The modular power infrastructure system of claim 11, wherein the expander includes a device chosen from a reciprocating engine, an axial flow turbine, and a radial flow turbine.

17. A modular power infrastructure system comprising:
a supercritical power module including:
a compressor structured to compress a supercritical fluid;
a recuperator structured to heat compressed supercritical fluid;
an outlet path structured to provide heated compressed supercritical fluid from the recuperator to a heat source;
an inlet path structured to provide heated compressed supercritical fluid from the heat source;
an expander coupled to receive heated compressed supercritical fluid from the heat source and structured to convert a drop in enthalpy of supercritical fluid to mechanical energy;
a cooler structured to cool expanded supercritical fluid from the expander and provide cooled supercritical fluid to the compressor;
a supercritical fluid supply path structured to supply supercritical fluid from the supercritical power module;
a supercritical fluid return path structured to return supercritical fluid to the supercritical power module; and
a work module in fluid communication with the supercritical fluid supply path and the supercritical fluid return path, the work module being coupled between the supercritical fluid supply path and the supercritical fluid return path and positioned to extract energy from supercritical fluid.

18. The modular power infrastructure system of claim 17, further comprising a thermal input module in fluid communication with the outlet path and the inlet path, the thermal input module including a heat source structured to heat compressed supercritical fluid.

19. The modular power infrastructure system of claim 18, wherein the thermal input module further includes a waste heat supply path structured to supply waste heat from the thermal input module to at least one selected other module.

20. The modular power infrastructure system of claim 17, wherein the work module includes at least one thermo mechanical work device.

21. The modular power infrastructure system of claim 17, wherein the supercritical power module further includes an electrical power generator coupled to the expander.

22. The modular power infrastructure system of claim 17, wherein the expander includes a device chosen from a reciprocating engine, an axial flow turbine, and a radial flow turbine.

23. A modular power infrastructure system comprising:
a supercritical power module including:
a first compressor structured to compress a supercritical fluid;
a first recuperator structured to heat compressed supercritical fluid from the first compressor;
a second compressor structured to compress a supercritical fluid in parallel with the first compressor;

a second recuperator structured to heat compressed supercritical fluid from the first compressor and the second compressor;

an outlet path structured to provide heated compressed supercritical fluid from the second recuperator to a heat source;

an inlet path structured to provide heated compressed supercritical fluid from the heat source;

an expander coupled to receive heated compressed supercritical fluid from the heat source and structured to convert a drop in enthalpy of supercritical fluid to mechanical energy;

a cooler structured to cool expanded supercritical fluid from the first recuperator and provide cooled supercritical fluid to the first compressor;

a supercritical fluid supply path structured to supply supercritical fluid from the supercritical power module;

a supercritical fluid return path structured to return supercritical fluid to the supercritical power module; and a heat rejection module in fluid communication with the supercritical fluid supply path and the supercritical fluid return path;

wherein the supercritical supply path and the supercritical return path are coupled to the supercritical power module at one of the following locations:

between an outlet of the first compressor and a first inlet of the second recuperator;

between a first outlet of the second recuperator and the outlet path;

between the inlet path and an inlet of the expander;

between an outlet of the expander and a second inlet of the second recuperator;

between a second outlet of the second recuperator and a second inlet of the first recuperator;

between a second outlet of the first recuperator and an inlet of the cooler;

between an outlet of the cooler and an inlet of the second compressor;

between an outlet of the second compressor and a first inlet of the first recuperator; or between a first outlet of the first recuperator and the first inlet of the second recuperator.

24. The modular power infrastructure system of claim 23, further comprising a thermal input module in fluid communication with the outlet path and the inlet path, the thermal input module including a heat source structured to heat compressed supercritical fluid.

25. The modular power infrastructure system of claim 24, wherein the thermal input module further includes a waste heat supply path structured to supply waste heat from the thermal input module to at least one selected other module.

26. The modular power infrastructure system of claim 23, wherein the heat rejection module includes a heat exchanger.

27. The modular power infrastructure system of claim 23, wherein the supercritical power module further includes an electrical power generator coupled to the expander.

28. The modular power infrastructure system of claim 23, wherein the expander includes a device chosen from a reciprocating engine, an axial flow turbine, and a radial flow turbine.

29. A modular power infrastructure system comprising:
a supercritical power module including:
a first compressor structured to compress a supercritical fluid;
a first recuperator structured to heat compressed supercritical fluid from the first compressor;
a second compressor structured to compress a supercritical fluid in parallel with the first compressor;
a second recuperator structured to heat compressed supercritical fluid from the first compressor and the second compressor;
an outlet path structured to provide heated compressed supercritical fluid from the second recuperator to a heat source;
an inlet path structured to provide heated compressed supercritical fluid from the heat source;
an expander coupled to receive heated compressed supercritical fluid from the heat source and structured to convert a drop in enthalpy of supercritical fluid to mechanical energy;
a cooler structured to cool expanded supercritical fluid from the first recuperator and provide cooled supercritical fluid to the first compressor;
a supercritical fluid supply path structured to supply supercritical fluid from the supercritical power module;
a supercritical fluid return path structured to return supercritical fluid to the supercritical power module; and
a work module in fluid communication with the supercritical fluid supply path and the supercritical fluid return path, the work module being coupled between the supercritical fluid supply path and the supercritical fluid return path and positioned to extract energy from supercritical fluid.

30. The modular power infrastructure system of claim 29, further comprising a thermal input module in fluid communication with the outlet path and the inlet path, the thermal input module including a heat source structured to heat compressed supercritical fluid.

31. The modular power infrastructure system of claim 30, wherein the thermal input module further includes a waste heat supply path structured to supply waste heat from the thermal input module to at least one selected other module.

32. The modular power infrastructure system of claim 29, wherein the work module includes at least one thermo mechanical work device.

33. The modular power infrastructure system of claim 29, wherein the supercritical power module further includes an electrical power generator coupled to the expander.

34. The modular power infrastructure system of claim 29, wherein the expander includes a device chosen from a reciprocating engine, an axial flow turbine, and a radial flow turbine.

* * * * *